(12) United States Patent
Abiko et al.

(10) Patent No.: US 7,965,874 B2
(45) Date of Patent: Jun. 21, 2011

(54) BIOLOGICAL INFORMATION DETECTING DEVICE

(75) Inventors: Yukihiro Abiko, Kawasaki (JP); Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1018 days.

(21) Appl. No.: 11/268,708

(22) Filed: Nov. 8, 2005

(65) Prior Publication Data

US 2006/0056700 A1    Mar. 16, 2006

Related U.S. Application Data

(63) Continuation of application No. PCT/JP03/006072, filed on May 15, 2003.

(51) Int. Cl.
*G06K 9/00* (2006.01)
(52) U.S. Cl. .................................................. 382/116
(58) Field of Classification Search .......... 382/124–126
See application file for complete search history.

(56) References Cited

U.S. PATENT DOCUMENTS

| | | | | |
|---|---|---|---|---|
| 5,268,967 A * | 12/1993 | Jang et al. | | 382/132 |
| 5,524,070 A * | 6/1996 | Shin et al. | | 382/274 |
| 5,572,597 A * | 11/1996 | Chang et al. | | 382/125 |
| 5,825,924 A | 10/1998 | Kobayashi | | |
| 5,883,971 A * | 3/1999 | Bolle et al. | | 382/124 |
| 5,995,640 A * | 11/1999 | Bolle et al. | | 382/124 |
| 5,999,987 A | 12/1999 | O'Farrell et al. | | |
| 6,125,192 A | 9/2000 | Bjorn et al. | | |
| 6,249,613 B1 * | 6/2001 | Crinon et al. | | 382/236 |
| 6,263,091 B1 * | 7/2001 | Jain et al. | | 382/124 |
| 6,330,345 B1 | 12/2001 | Russo et al. | | |
| 6,535,622 B1 | 3/2003 | Russo et al. | | |
| 6,876,757 B2 * | 4/2005 | Yau et al. | | 382/125 |
| 7,539,331 B2 * | 5/2009 | Wendt et al. | | 382/124 |
| 2001/0036300 A1 * | 11/2001 | Xia et al. | | 382/125 |
| 2002/0146166 A1 * | 10/2002 | Rao et al. | | 382/164 |
| 2002/0146178 A1 * | 10/2002 | Bolle et al. | | 382/254 |
| 2002/0191821 A1 * | 12/2002 | Bornes | | 382/124 |

FOREIGN PATENT DOCUMENTS

| | | |
|---|---|---|
| EP | 0 623 890 | 11/1994 |
| EP | 0 667 575 | 8/1995 |
| JP | 61-79375 | 4/1986 |
| JP | 63-244284 | 10/1988 |
| JP | 2-203671 | 8/1990 |
| JP | 3-296873 | 12/1991 |
| JP | 6-319025 | 11/1994 |

(Continued)

OTHER PUBLICATIONS

New enhancement algorithm for fingerprint images, Kim et al., IEEE, 1051-4651, 2002, pp. 879-882.*

(Continued)

*Primary Examiner* — Samir A Ahmed
*Assistant Examiner* — Jayesh Patel
(74) *Attorney, Agent, or Firm* — Staas & Halsey LLP

(57) ABSTRACT

When an image representing biological information is input from a biological information input unit 10, such as a fingerprint sensor or the like, for obtaining an image representing biological information, such as a fingerprint or the like, statistical quantities, such as the mean value and standard deviation of the pixel values of the sampled image, are calculated. Then, using the statistical quantities, a region containing biological information is extracted, its sensitivity variations are eliminated and the effects of stains, such as a residual fingerprint is nullified, thereby generating a favorable biological image with high contrast.

11 Claims, 25 Drawing Sheets

FOREIGN PATENT DOCUMENTS

| | | |
|---|---|---|
| JP | 6-350851 | 12/1994 |
| JP | 8-110860 | 4/1996 |
| JP | 11-134498 | 5/1999 |
| JP | 2000-222588 | 8/2000 |
| JP | 2000-322559 | 11/2000 |
| JP | 2001-319234 | 11/2001 |
| JP | 2001-521665 | 11/2001 |
| JP | 2002-298126 | 10/2002 |
| JP | 2003-44856 | 2/2003 |
| WO | 98/48371 | 10/1998 |

OTHER PUBLICATIONS

Japanese Patent Office Action, mailed Aug. 19, 2008 and issued in corresponding Japanese Patent Application No. 2004-571858.

European Patent Office Summons to Attend Oral Proceedings, mailed Jan. 16, 2008 and issued in corresponding European Patent Application No. 03725787.0-2218.

European Patent Office Invitation pursuant to Article 94(3) and Rule 71(1) EPC, dated Jun. 5, 2008 and issued in corresponding European Patent Application No. 03725787.0-2218.

European Patent Office Action, mailed Jan. 17, 2007, and issued in corresponding European Patent Application No. 03 725 787.0-2218.

Kim, B.-G., et al., "Adaptive image normalisation based on block processing for enhancement of fingerprint image", Electronics Letters, vol. 38, No. 14, Jul. 2002, pp. 696-698.

Teruyuki Higuchi, "Fingerprint Authentication System / New Fingerprint Sensor", NEC Technical Journal, vol. 55, No. 3, 2002.

Communication from the European Patent Office for European Patent Application No. 03 725 787.0; mailed Oct. 2, 2006.

Maltoni et al, "Handbook of Fingerprints Recognition" 2003; Sectio 3.5: Segmentation. pp. 94-95.

European Search Report for Application No. 03725787.0-2218; mailed Jul. 11, 2006.

\* cited by examiner

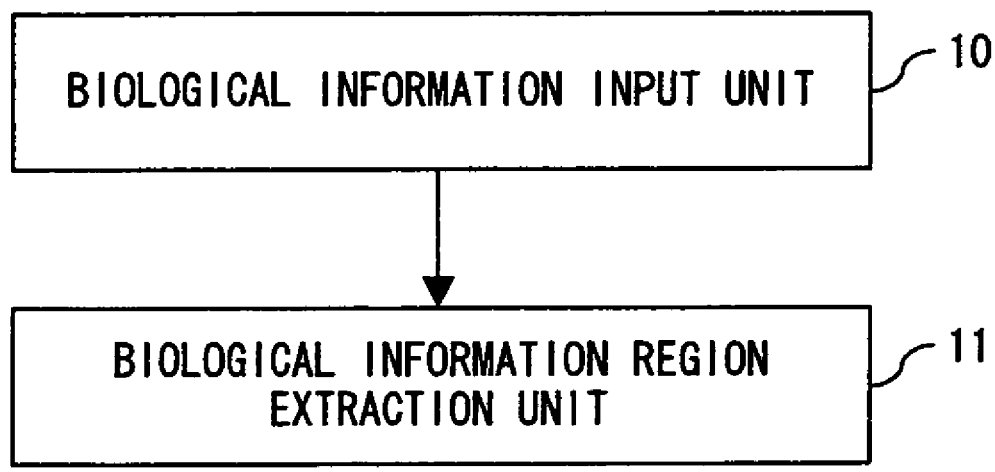
F I G. 1

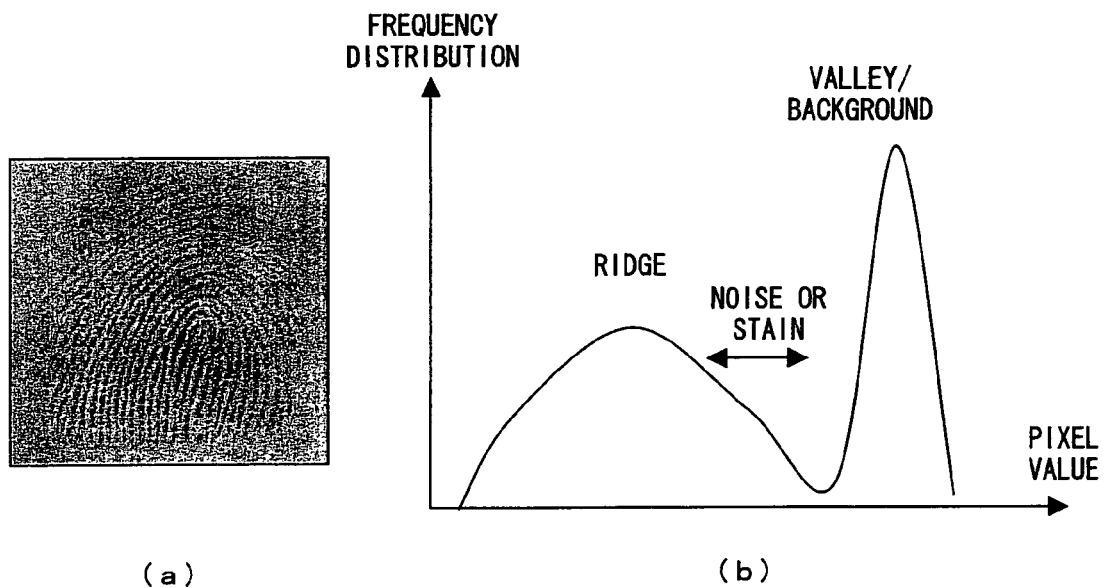
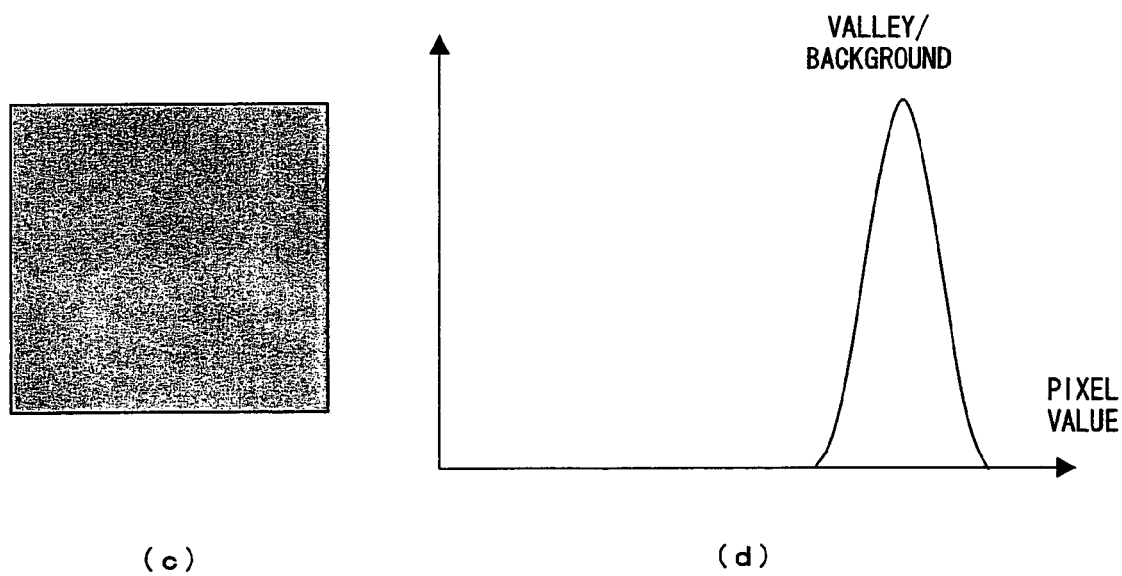
F I G. 3

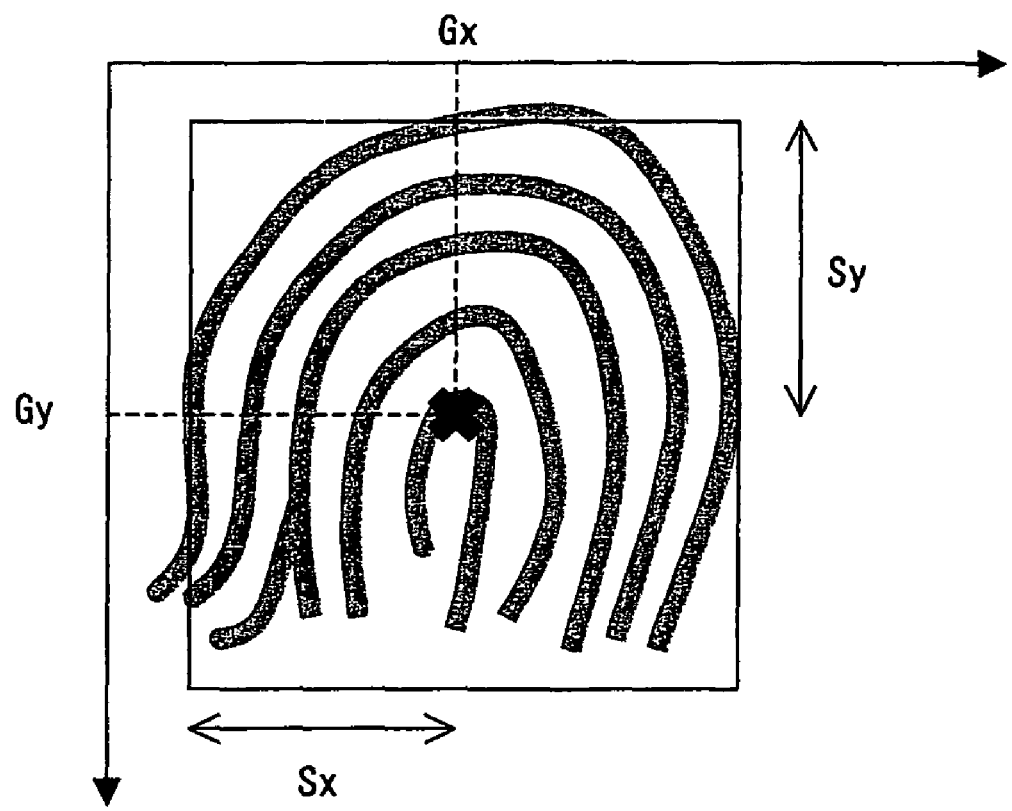
F I G. 4

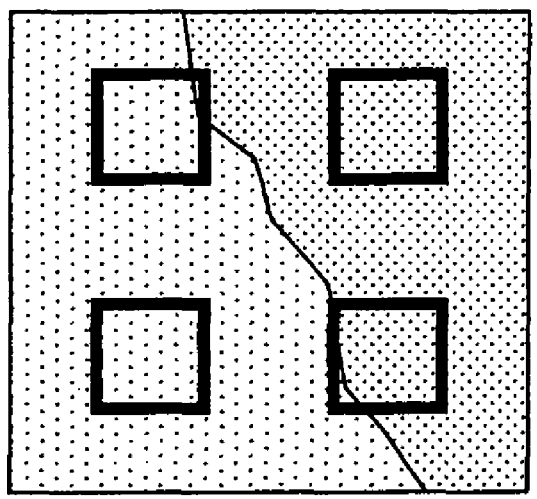
F I G. 6

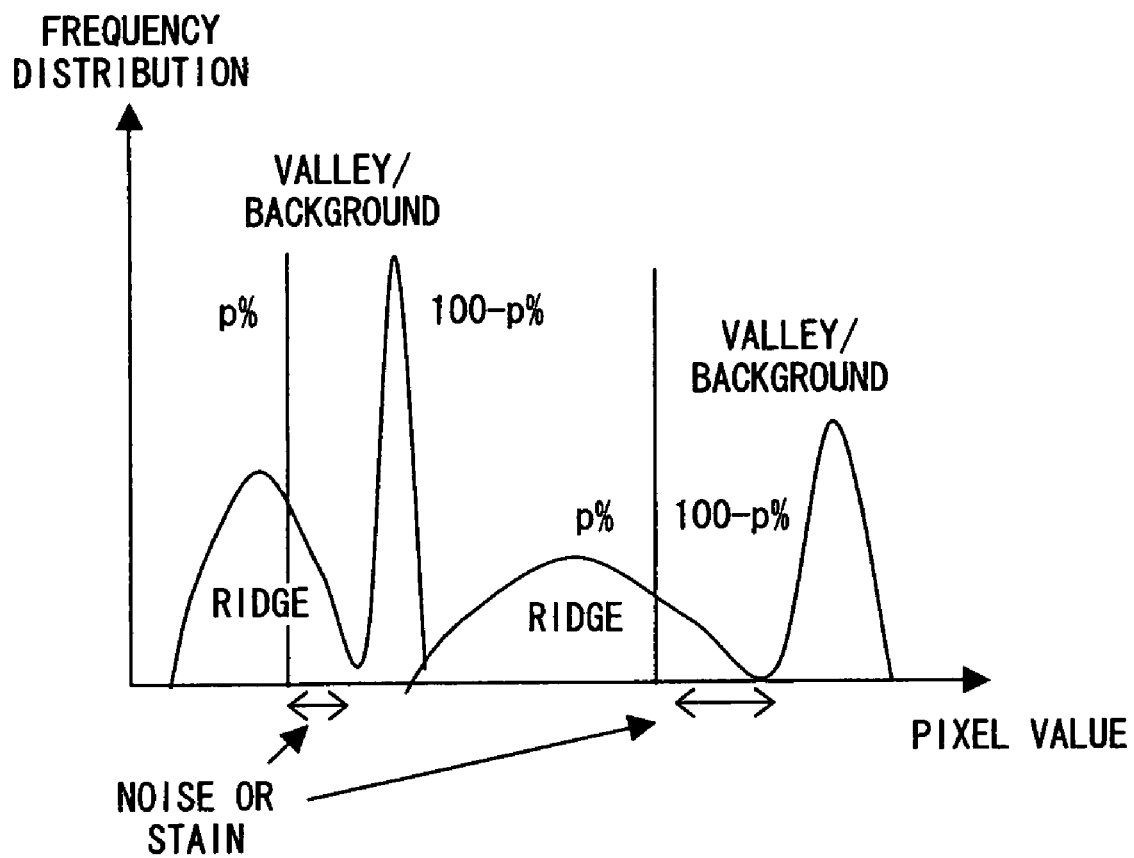
F I G. 9

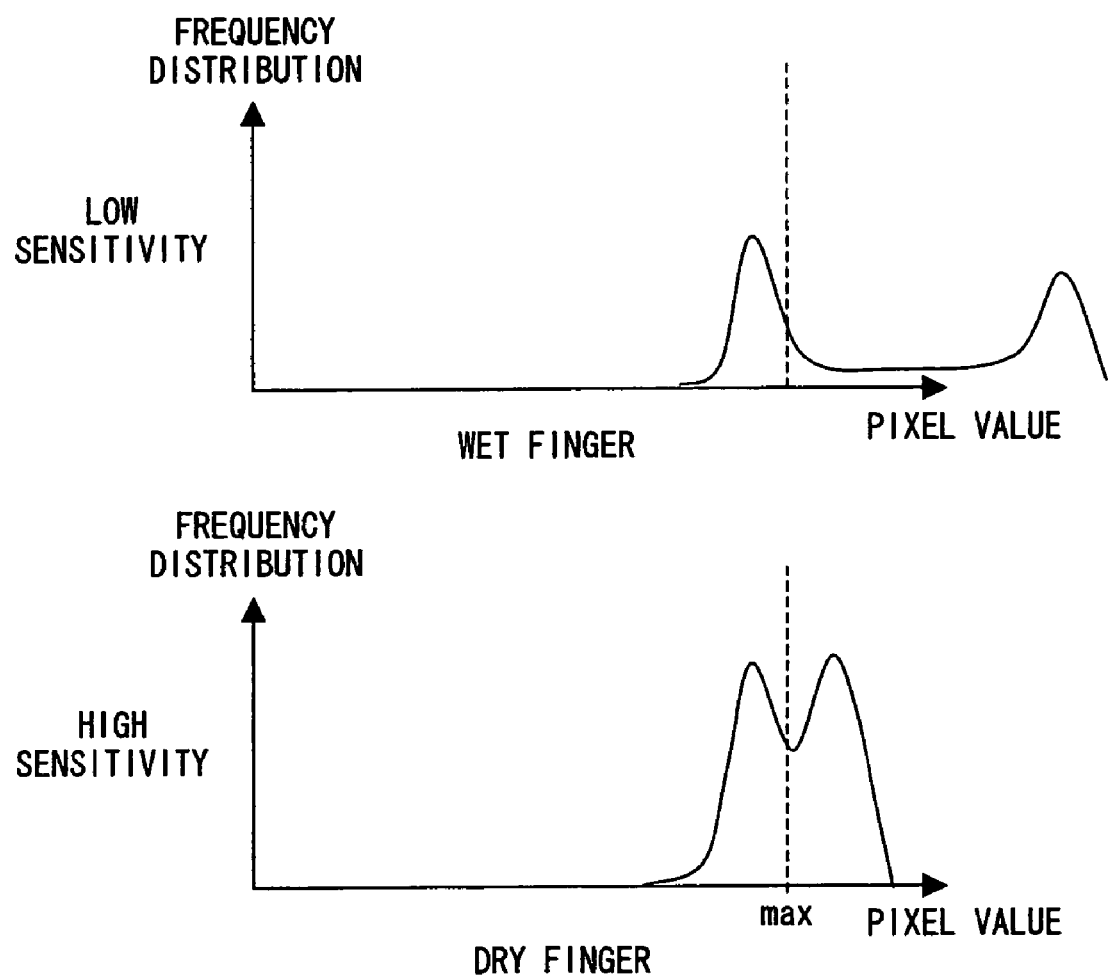
F I G. 1 2

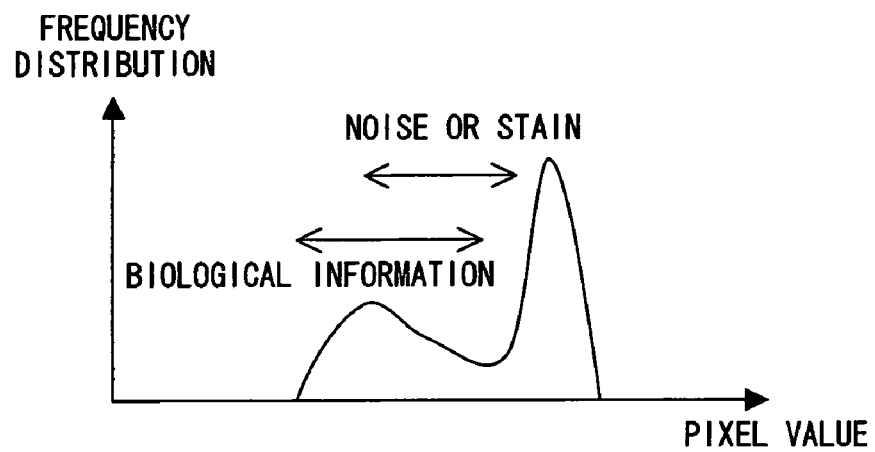
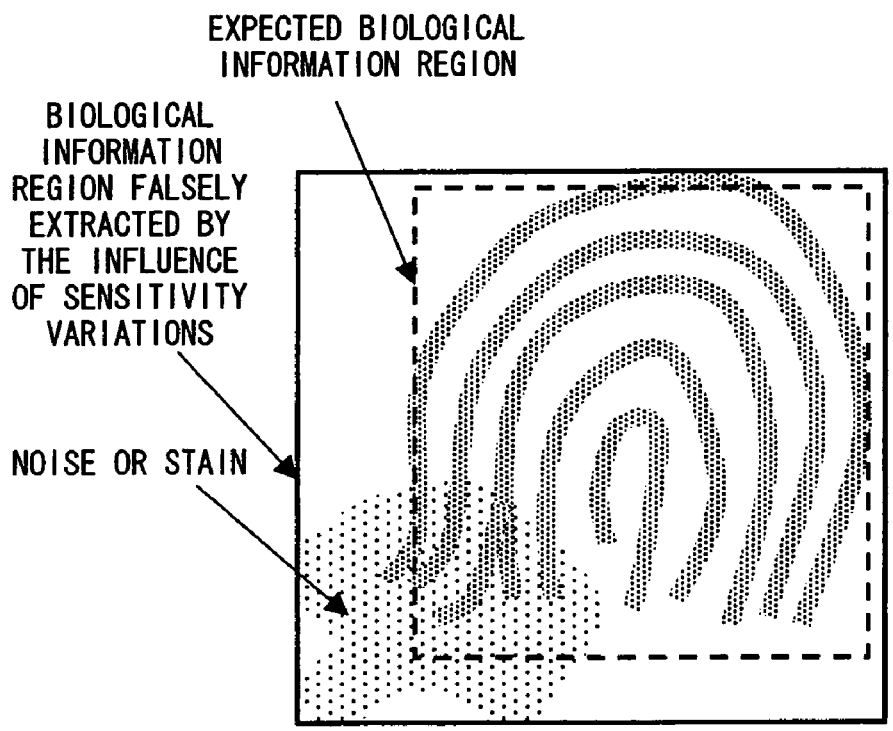
FIG. 13

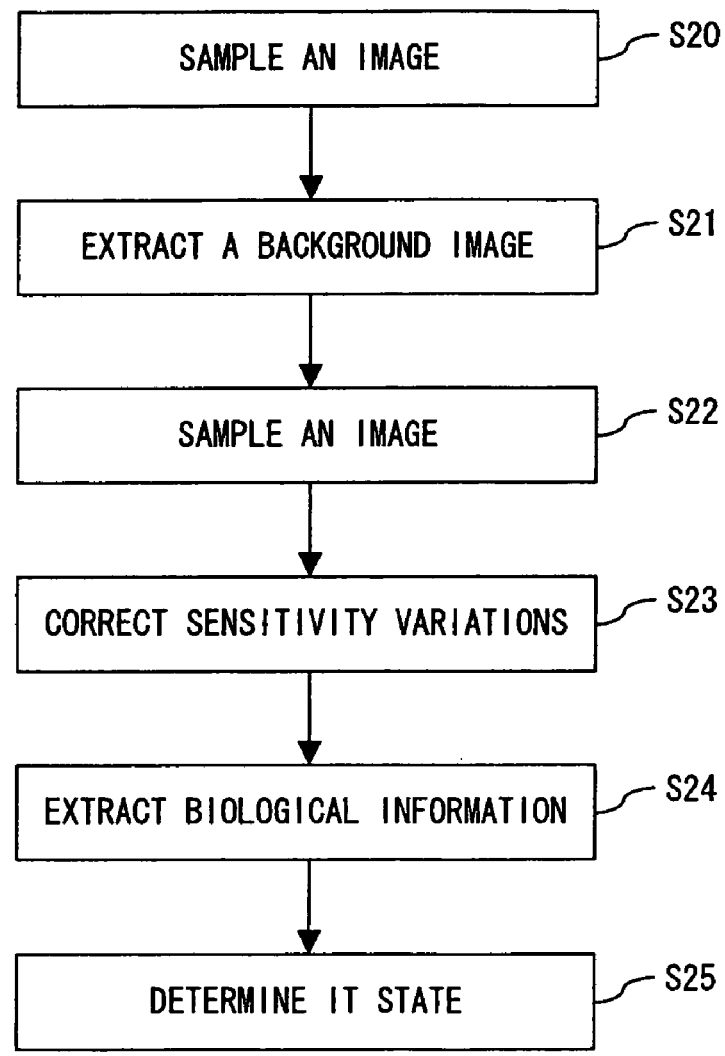
F I G. 1 4

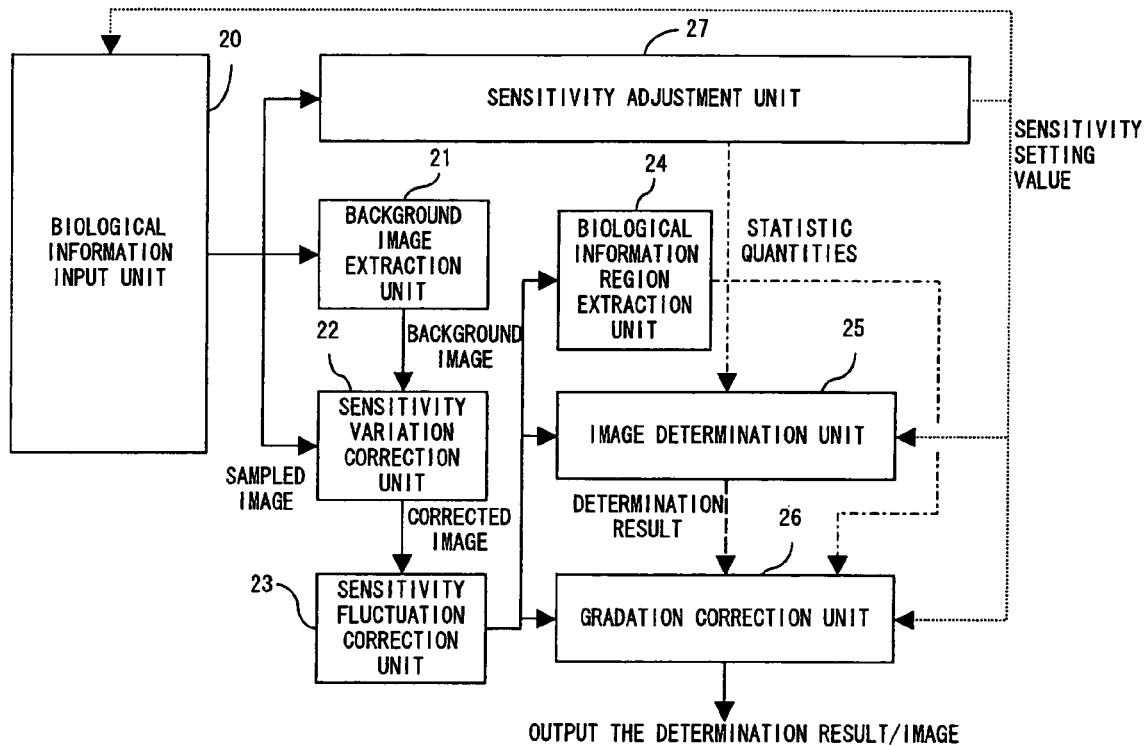
F I G. 17

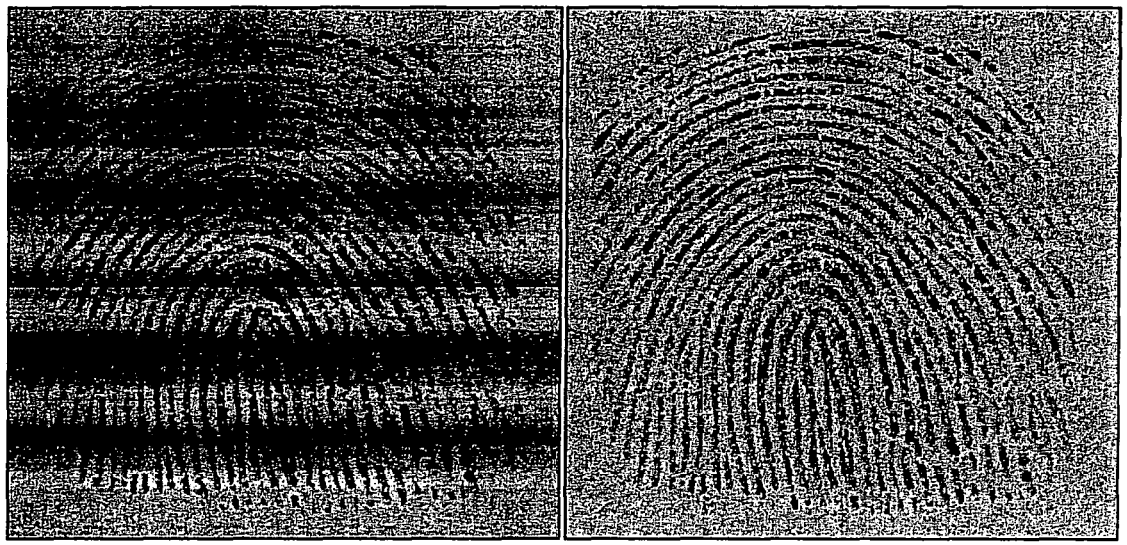
F I G. 2 0

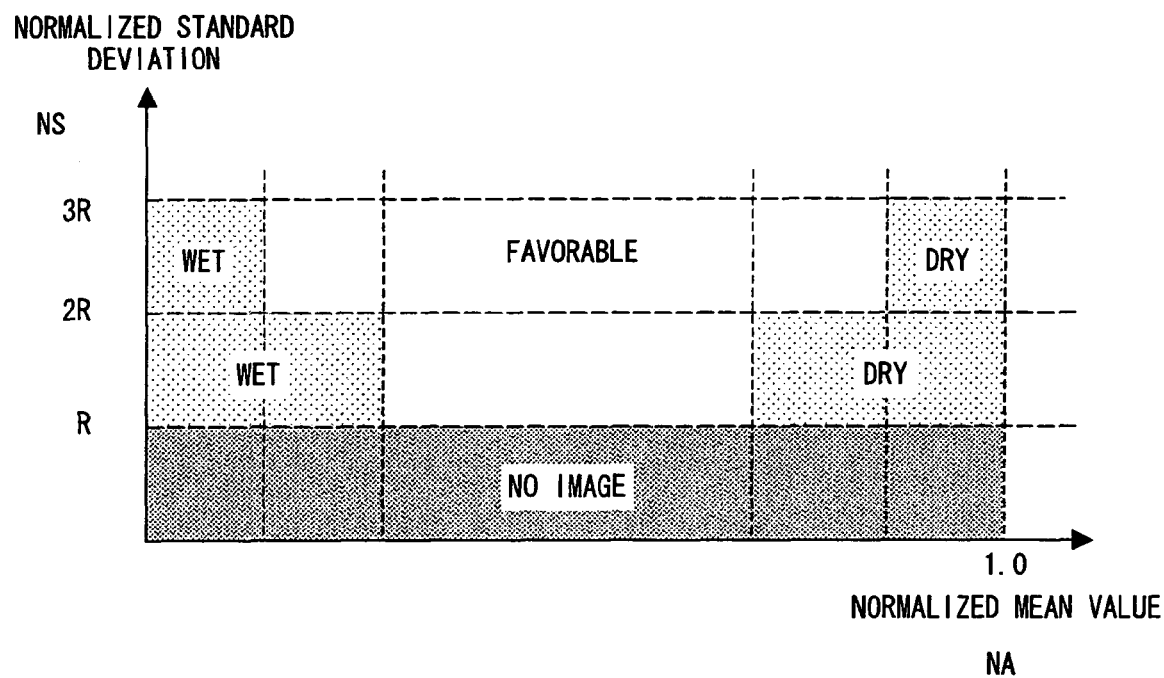
F I G. 2 1

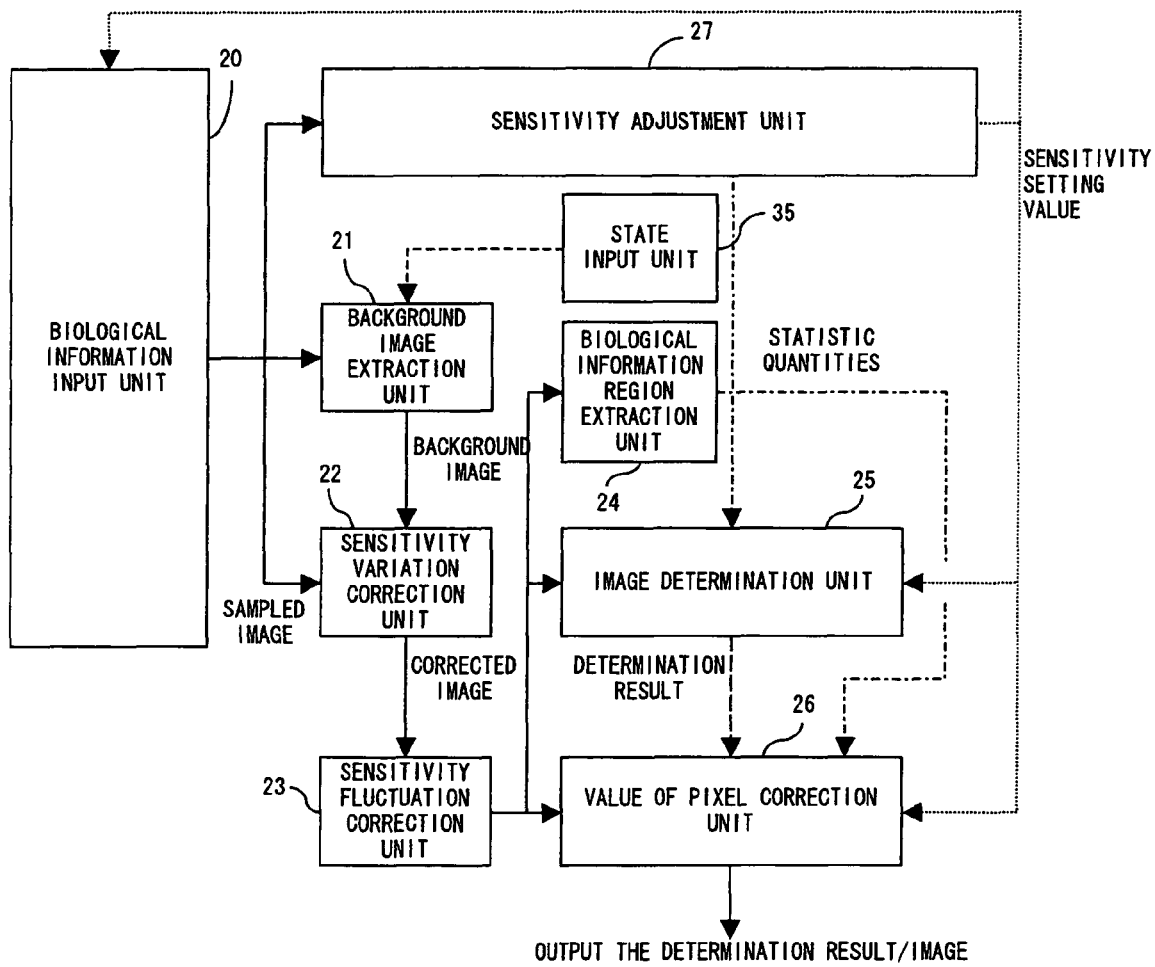
F I G. 2 4

BIOLOGICAL INFORMATION DETECTING DEVICE

CROSS REFERENCE TO RELATED APPLICATION

This application is a continuation of international PCT application No. PCT/JP2003/006072 filed on May 15, 2003.

BACKGROUND OF THE INVENTION

1. Field of the Invention

The present invention relates to a biological information detecting device for extracting biological information from an image detected by scanning biological information having an undulating structure composed of peak parts which protrude at least from its surroundings and trough parts which are lower than their surroundings.

2. Description of the Related Art

Conventionally, when outputting a biological information image to a personnel authentication device for identifying the relevant person, a skin status analyzing device for analyzing the status of a biological epidermis or the like in a biological information extraction device, the value of pixel of a biological information image varies depending on variations of factors, such as variations of individuals, the environment, machine variations and the like. Therefore, it is necessary to eliminate such variations factors as much as possible and to extract stable biological information. In a fingerprint image or a skin image in particular, if the epidermis is dry, the contrast of the value of pixel of biological information is low. Therefore, it is necessary to prevent part of the biological information from becoming blurred or being lost. If the epidermis is wet, the contrast of the value of pixel is high. Therefore, it is necessary to prevent biological information from being ruined by sweat and the like.

As technologies for improving the contrast of the value of pixel, the following are publicly known.

In patent reference 1 the pixel values of a fingerprint image integrated and it is determined whether to output the fingerprint image, using the peak value of a value of pixel level. Since a fingerprint must be sampled several times, sometimes a finger, which is a subject, moves during the sampling. In such a case, no appropriate biological information can be obtained, which is a problem. In the case of a dry finger, the number of samples increases, which is a problem especially.

As technologies for not integrating the pixel values, there are Patent references 2 and 3. In these technologies, the respective effects of dry/wet fingers are nullified by equalizing the histogram of a fingerprint image or expanding its value of pixel distribution using a general contrast control method. In these technologies, if there is sensitivity variation or noise, peculiar to a sensor in a fingerprint, the contrast of the noise as well as that of the biological information increases. Therefore, if the value of pixel of the noise is greater than that of a dry finger, it is difficult to collect an appropriate fingerprint image.

As technologies for eliminating noise, such as the sensitivity variations of a sensor, there are Patent references 5 and 6, in which value of pixel correction generally used in an image scanner as disclosed by Patent reference 4 is applied to a fingerprint image. In these technologies, a background image is initially obtained and then is subtracted from the sampled image. However, in Patent references 5 and 6, a difference is calculated simply, and does not correspond to the image sampled after adjusting the sensitivity in order to collect an appropriate dry/wet fingerprint. Furthermore, if there are sensitivity fluctuations in a sensor as well, it cannot be used. As reference literature that addresses the problem of the sensitivity fluctuations of a sensor, there is a Non-patent reference 1.

There are also technologies for outputting whether or not biological information is contained. In the above-mentioned Patent reference 1, the value of pixel values of a fingerprint image are integrated and it is determined whether to output biological information, using the peak value of the value of pixel level. Patent reference 7 analyzes a histogram for each block and counts blocks containing a ridge, based on a predetermined threshold value. Patent reference 8 blurs an input image using a low-pass filter, and uses it as a mask pattern for separating the binarized image into the background and biological information. In any of the technologies, if a residual fingerprint adheres to a contact type sensor there is a possibility that patterns other than the desired biological information, such as sensitivity fluctuations, a residual fingerprint and the like may be output as meaningful information.

Generally, the size of a sensor is larger than the extraction range of the biological information. Therefore, the size of a sensor contains a lot of redundant information. However, in any of the above-mentioned technologies, the size of a sensor determines neither the location nor range of biological information.

Patent Reference 1:
  Japanese Patent Application Publication No. 2001-319234
Patent Reference 2:
  Japanese Patent Application Publication No. H8-110860
Patent Reference 3:
  Japanese Patent Application Publication No. 2000-322559
Patent Reference 4:
  Japanese Patent Application Publication No. H2-203671
Patent Reference 5:
  Japanese Patent Application Publication No. H11-134498
Patent Reference 6:
  Japanese Patent Application Publication No. 2001-521665
Patent Reference 7:
  Japanese Patent Application Publication No. 2002-298126
Patent Reference 8:
  Japanese Patent Application Publication No. 2003-44856
Non-Patent Reference 1:
  NEC Technical Report Vol. 55, No. 3/2002, p. 21, FIG. 4, Upper left

SUMMARY OF THE INVENTION

It is an object of the present invention to provide a method for detecting biological information insusceptible to the influences of the status of a living body and the noise of a sensor in a biological information detecting device.

The biological information detecting device of the present invention comprises a biological information input unit for detecting and visualizing biological information and a biological information region extraction unit for calculating statistical quantities using the value of pixel distribution of an image sampled by the biological information input unit and extracting a region containing the biological information, based on the statistical quantities.

According to the present invention, statistical quantities which reflect biological information contained in a sampled image can be calculated and thus the region in which the biological information exists can be more appropriately extracted based on the statistical quantities, allowing more appropriate region extraction.

BRIEF DESCRIPTION OF DRAWINGS

FIG. 1 shows the principle of the present invention.

FIG. 3 shows sampled images and histograms of the pixel values of the images.

FIG. 4 explains the second aspect of the preferred embodiment of the present invention.

FIG. 6 explains a process of specifying a background image by the value of pixel distribution of a partial region.

FIGS. 9 and 10 explain the seventh aspect of the preferred embodiment of the present invention.

FIG. 12 explains the tenth aspect of the preferred embodiment of the present invention.

FIG. 13 explains the eleventh aspect of the preferred embodiment of the present invention.

FIG. 14 is a flowchart showing the process of the fourteenth aspect of the preferred embodiment of the present invention.

FIG. 17 shows the block configuration diagram of the biological information detecting device in the preferred embodiment of the present invention.

FIG. 20 shows an example of the correction of sensitivity fluctuations.

FIG. 21 shows a typical example of a table for classifying states.

FIG. 24 shows the third configuration of the biological information detecting device in the preferred embodiment of the present invention.

DESCRIPTION OF THE PREFERRED EMBODIMENTS

FIG. 1 shows the principle of the present invention.

The biological information detecting device of the present invention comprises a biological information input unit 10 for visualizing biological information and a biological information region extraction unit 11 for extracting a region containing biological information, based on the statistical quantities of the value of pixel of an image sampled by the biological information input unit 10.

Figure 2:
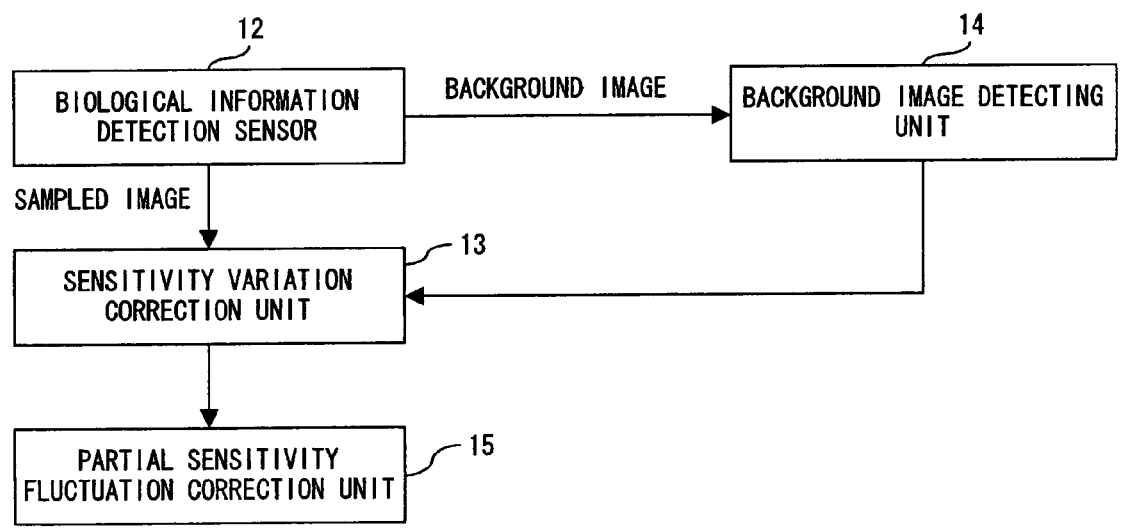
FIG. 2 shows a second principle of the present invention.

FIG. 2 shows the second principle of the present invention.

The biological information device of the present invention comprises a biological information detection sensor 12 corresponding to the biological information input unit 10 for visualizing biological information, a background image detection unit 14 for detecting a background image, a sensitivity variation correction unit 13 for correcting the sensitivity variations of the biological information input unit, using the ratio between a sampled image and a background image and a partial sensitivity fluctuation correction unit 15 for correcting partial sensitivity fluctuations by homogenizing the value of pixel level of the background for each partial region.

According to the present invention, appropriate biological information can be detected from a sampled image, such as a fingerprint susceptible to the influence of value of pixel contrast fluctuations due to the environment or sensor characteristics, and noise or the like.

The biological information detecting device in the first aspect of the preferred embodiment of the present invention can realize a function to detect biological information by extracting a region in which meaningful biological information exists even though there are differences in noise, such as sensitivity variations and the like, sensor stain and value of pixel contrast fluctuations.

In the following description, a fingerprint is used as an example of the biological information.

It is known that a fingerprint has a structure which protrudes from its surroundings, called a "ridge" and a structure surrounded by the ridges, called a "valley" as its characteristic. A fingerprint image is sampled as a two-dimensional distribution of quantized data by digitizing a distance from the ridge or the inclination of the ridge.

FIG. 3 shows a sampled image and the histogram of the pixel values of the image.

If fingerprint information is indicated by a distance, as shown in FIGS. 3A and 3B, relatively small pixel values indicate a ridge, and relatively large pixel values indicate a valley or the background. In such a case, a value of pixel frequency distribution has two peaks. Therefore, the mean value of the image can be roughly regarded as a boundary for separating the ridge from the valley. If a background image alone is sampled, as shown in FIGS. 3C and 3D, the value of pixel frequency distribution forms a histogram with a single peak containing a valley or background pixels. However, in the biological information input unit, noise and stains are often included as information other than ridges. Depending on the characteristics of the biological information input unit, the valley sometimes has a value intermediate between the ridge and the background. Therefore, a pixel value (threshold value) T for separating the ridge from the others is defined as follows, based on the standard deviation $\sigma$ and mean value $\mu$ of a sampled image f(x, y), assuming that a sampled image containing no biological information contains white noise. f(x, y) is the pixel value (brightness value) of a sampled image.

$$T = \mu - c \times \sigma \quad \text{(the first expression)}$$

In the above equation, $$\mu = (1/N)\Sigma\Sigma f(x,y)$$

$$\sigma = \sqrt{((1/N)\Sigma\Sigma f(x,y) - \mu)^2)}$$

In the above equation, N is the number of pixels and (x, y) indicates the location of a pixel.

According to the above-mentioned method based on the above-mentioned assumption, for an actual image, its error becomes large. However, if it is assumed that the value of pixel distribution of the sampled image assumes a normal distribution, for example, if c=1.0 or c=2.0, at least 31.74% or 4.56% of the entire image can be regarded as a ridge respectively. According to the above equation, no ridge pixel depends on the value of pixel contrast of the sampled image.

Therefore, even if there are differences in noise, such as sensitivity variations or the like, sensor stain or value of pixel contrast fluctuations, a region in which meaningful biological information exists can be extracted.

In this case, even if a pixel value is inverted, the same argument can be applied by inverting the relationship between pixel values. The same should be appreciated in the explanation below.

The biological information detecting device in the second aspect of the preferred embodiment of the present invention can realize a function to extract the location and range of meaningful biological information.

FIG. 4 explains the second aspect of the preferred embodiment of the present invention.

If c>1.0 in the first equation, it can be roughly regarded that ridges are extracted. Therefore, the location ($G_x$, $G_y$) of biological information in a sampled image can be defined by calculating the centroid of the location of a pixel to be regarded as a ridge as follows.

$$G_x = (\Sigma F(x,y) \cdot x) / (\Sigma F(x,y))$$

$$G_y = (\Sigma F(x,y) \cdot y) / (\Sigma F(x,y))$$

In this case, if $f(x,y) \leq T$, $F(x, y) = 1$ and if $f(x,y) > T$, $F(x,y) = 0$ (the second equation)

Furthermore, the range of biological information can be considered as the variations of pixels regarded as ridges. Therefore, the second order moment around the centroid is utilized. More specifically, the range of biological information ($S_x$, $S_y$) can be defined as follows.

$$S_x = \xi \times \sqrt{(M20/\Sigma F(X,Y))}$$

$$S_y = \eta \times \sqrt{(M02/\Sigma F(x,y))}$$

In this case, $$M_{pq} = \Sigma\Sigma((x-G_x)^p (y-G_y)^q) \times F(x,y)$$ (the third equation)

$\xi > 1.0$, $\eta > 1.0$

A range with each side of $2 \times S_x$ and $2 \times S_y$, and the centroid ($G_x$, $G_y$) as the center, as shown in FIG. 4, is obtained.

In the extraction of biological information, firstly, the range of a region surrounding biological information to be output as a detection result and secondly, a range containing only biological information for analyzing the state of a living body are needed.

Firstly, the range of a region surrounding biological information to be output as a detection result is described.

If a general fingerprint sensor is used as a biological information input unit, in most cases, the shape of the sensor surface is rectangular. Therefore, it is assumed that the biological information distribution assumes a rectangular outer shape and is uniform. $S_x$ in the case of $\xi = 1.0$, that is, the root of the second order moment becomes the standard deviation of the distribution of pixels that are determined to be ridges in the case where an image is projected in the Y direction. It is known that standard deviation of an ideal uniform distribution is $1/\sqrt{12}$. Therefore, if the area of a rectangle with sides of $2S_x$ and $2S_y$ is 1, the following relationship is obtained.

$$S_x = \xi \times \sqrt{(M20/\Sigma F(x,y))} = \frac{1}{2}$$

$$S_y = \eta \times \sqrt{(M02/\Sigma F(x,y))} = \frac{1}{2}$$ (the fourth equation)

By assigning $\xi \geq \sqrt{3}$ and $\eta \geq \sqrt{3}$ to the above equation, a rectangular area surrounding a region containing biological information can be extracted.

Sometimes the aperture shape of the biological information input unit is elliptic. Therefore, it is assumed that the outer shape of the biological information distribution is elliptic and the projected profile in the axis direction of the biological information distribution assumes a normal distribution. Since approximately 95% of the distribution is included when the standard deviation is 2, most of the biological information is covered. Therefore, by assigning $\xi \geq 2$ and $\eta \geq 2$ to the above equation, a rectangular area surrounding a region containing biological information can be extracted.

As described above, a rectangular range in the case of $\xi = 2$ and $\eta = 2$ and a range clipped by the image size of the biological information input unit can be defined as the area of the biological information region.

Next, the range containing only biological information for analyzing the state of a living body is described.

If it is assumed that a biological information distribution assumes a rectangular outer shape which is uniform, as described above, by using $\xi \leq \sqrt{3}$ and $\eta \leq \sqrt{3}$, thus a rectangular area surrounding a region containing biological information can be extracted.

Sometimes the aperture shape of the biological information input unit is elliptic. If it is assumed that the outer shape of a biological information distribution is elliptic, the following relationship holds true.

$$(x/S_x)^2 + (y/S_y)^2 = 1$$ (the fifth equation)

The maximum rectangle inscribed in this ellipse becomes the range. If the following differential equation is solved simultaneously with the fifth equation, by assigning $\xi = \sqrt{2}$ and $\eta = \sqrt{2}$ to the fifth equation, a rectangular area surrounding a region containing biological information can be extracted.

$$d/dx(xy) = 0$$ (the sixth equation)

Therefore, a rectangular range with a width of $S_x$ and a height of $S_y$ in the case of $\xi = \sqrt{2}$ and $\eta = \sqrt{2}$ can be defined as the biological information region. More specifically, a contact point of the fifth elliptic equation and a hyperbola $xy = k$ that provides the extreme value of the sixth equation becomes one vertex of the maximum rectangle inscribed in the ellipse.

Since the meaningful biological information region contains only ridges and valleys, except for exceptions, such as cracks and the like, such extraction is suitable for the value of pixel distribution analysis of a biological information image. For example, if in the value of pixel frequency distribution of a meaningful biological information region, an image is binarized by a threshold value in which the ratio of the number of pixels greater than the threshold value to the number of pixels less than the threshold value is 50%, ridges and valleys can be separated without depending on the contact area or contrast of the biological information.

If the value of pixel frequency distribution of the entire sampled image is used instead of the meaningful biological information region, the frequency distribution changes greatly due to the influence of its background. For example, if the image is binarized with a threshold value whose ratio is 50%, in exactly the same way a part of the background, valleys, noise or stains are extracted as biological information, which is a problem.

As described above, according to the preferred embodiment of the present invention, the location and range of meaningful biological information can be extracted.

The biological information detecting device in the third aspect of the preferred embodiment of the present invention can realize a function to correct sensitivity variations while preventing information from being lost due to correcting the sensitivity variations, using a sampled image containing biological information.

If the width of the value of pixel frequency distribution of sensitivity variations is located relatively close to the width of the value of pixel frequency distribution of biological information in a histogram in the biological information input unit, it is difficult to separate the biological information, for example, by a simple method such as a process using a threshold value.

Since a background image containing no biological information reflects the distribution of sensitivity variations as it is, the sensitivity variations can be eliminated by subtracting the background image from a sampled image as in shading correction generally used in image scanners and the like.

However, if the biological information input unit is provided with a sensitivity adjustment function, it is natural to think that sensitivity variation varies depending on sensitivity adjustment. However, if the sensitivity to be set differs between a background image and a sampled image, sensitivity variations remain somewhat and correction is insufficient even after correction using a difference such as shading correction is applied.

Figure 5:
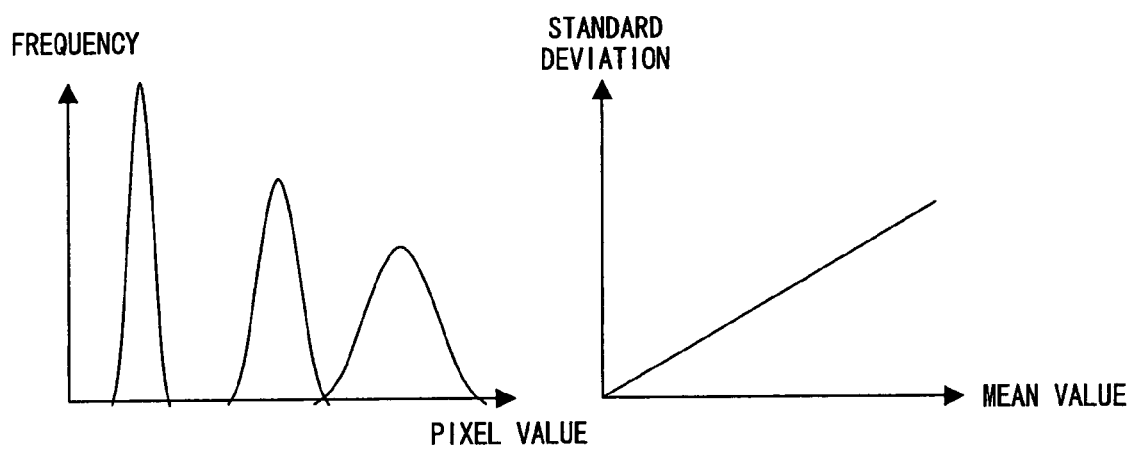
FIG. 5 explains the third aspect of the preferred embodiment of the present invention.

FIG. 5 explains the third aspect of the preferred embodiment of the present invention.

As shown in FIG. 5, if in the distribution of a histogram of a background image containing sensitivity variations, the standard deviation decreases and increases as its mean value decreases and increases, respectively, the sensitivity variations can be further reduced by correcting as follows. The left drawing shown in FIG. 5 expresses the above-mentioned relationship between a mean value and a standard deviation by pixel value and frequency.

$$A(x,y)=f(x,y)\times \mu B/B(x,y) \quad \text{(the seventh equation)}$$

In the above equation, A, B, μB and f represent the pixel value of an image after correction, the pixel value of a background image, the mean value of pixel values of the background image and the pixel value of the image before correction.

Specifically, if the pixel value of a background image and the pixel value of a sampled image are B(x, y) and f(x, y), respectively, the mean value of the pixel value of this background image is used to correct the pixel value f(x, y) to a pixel value A(x, y), using a ratio between μB and B(x, y). Since as shown in FIG. 5, the standard deviation and mean value are proportional, transformation by the seventh equation is available.

However, if the background image contains a stain that has the same degree of value of pixel contrast as biological information, or biological information itself, there is a possibility that the biological information of the sampled image may be lost. Therefore, in the background image detecting unit, a process of regarding such a stain or biological information as a background image is performed using the value of pixel distribution of the entire or a partial region.

FIG. 6 explains the process of regarding such a stain or biological information as a background image, using the value of pixel distribution of a partial region.

For example, if value of pixel variation due to sensitivity variations is regarded as white noise in the biological information input unit and is approximated to a normal distribution, it can be considered that some value of pixel patterns due to factors other than sensitivity variations contained in a sampled image increases as the deviation from normal distribution of the value of pixel frequency distribution of the sampled image increases.

As a method for determining whether a value of pixel distribution is close to a normal distribution, for example, a method using the characteristics of a normal distribution can be used.

A normal distribution is characterized in that the kurtosis K and the skewness S become larger than 3 and 0, respectively.

The kurtosis and skewness of a histogram H(i) can be obtained as follows.

$$S=(\Sigma(i-\mu H)^3 \times H(i))/\sigma H^3 \quad \text{(the eighth equation)}$$

$$K=(\Sigma(i-\mu H)^4 \times H(i))/\sigma H^4 \quad \text{(the ninth equation)}$$

In the above equation, μH and σH are the mean value and standard deviation, respectively, of H(i).

The skewness and kurtosis indicate the skewness from the symmetry of a histogram shape and the degree of concentration around the average of a histogram, respectively.

If a sampled image is partially determined, as shown in FIG. 6, the sampled image can also be divided into a plurality of regions. By determining a sampled image after dividing it into a plurality of regions, sensitivity variations are partially regarded as white noise as shown in FIG. 6. Even when it cannot be regarded as white noise as a whole, it can be determined to be a background image.

Accordingly, sensitivity variations can be corrected while preventing information from being lost due to correcting sensitivity variations using a sampled image containing biological information.

The biological information detecting device in the fourth aspect of the preferred embodiment of the present invention generates an image by scanning biological information line by line. For example, if the biological information detecting device is connected to the AC mains, sometimes common mode noise of 50 Hz/60 Hz is mixed with the power. In biological information input units utilizing the electrical characteristics of a human body, such as a capacitance type sensor, an electric field type sensor or the like, noise from the human body is mixed. In these cases, striped noise different from biological information appears along the direction of a scanning line on a sampled image.

Figure 7:
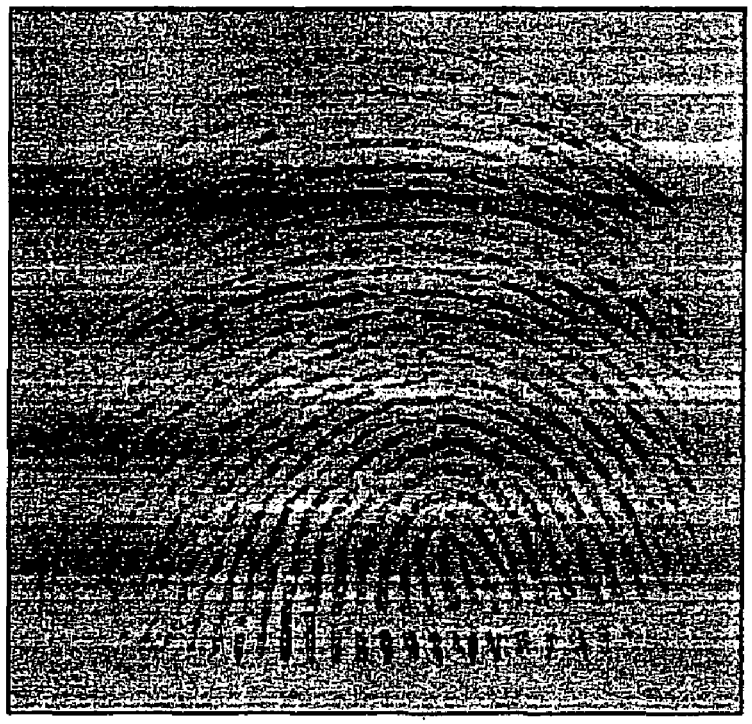
FIG. 7 shows an image containing common mode noise in a fingerprint image.

FIG. 7 shows an image containing common mode noise in a fingerprint image.

The stripped noise shown in FIG. 7 can be eliminated by eliminating the fluctuating part of an offset using a floating threshold value method or a band-pass filter and the pixel values of a background can be unified. However, if the floating threshold value method or band-pass filter method is applied when the frequency band of striped noise overlaps biological information, there is a possibility that meaningful biological information may be lost.

In this case, it is effective to calculate the average pixel value of a background or a threshold value for separating a background from biological information for each scanning line and to correct in such a way that the respective threshold values of scanning lines may become uniform. For example, if a fingerprint is sampled, its value of pixel distribution is bipolarized into a ridge and a region other than the ridge. Therefore, the value of pixel frequency distribution has two peaks. Accordingly, the upper peak value from the region excluding the ridge can be extracted as a representative pixel value of the background. If the value of pixel frequency distribution has a single peak, it is natural to think that ridges are never uniformly distributed on one straight line across the entire scanning line. Therefore, a representative pixel of the background can also be determined using a threshold value or fixed threshold value obtainable by the P-tile method. If the P-tile method is used, it is useful to approximate the value of pixel distribution to a normal distribution since it has a single peak and to specify a pixel value that becomes μ+c×σ as a threshold value. In this case, μ, σ and c are the mean value of a value of pixel frequency distribution, the standard deviation of the value of pixel frequency distribution and a co-efficient greater than 0, respectively.

Accordingly, the biological information detecting device has a function to correct partial sensitivity fluctuations, and a biological information image from which the influence of scanning line noise and the like is nullified can be detected.

The biological information detecting device in the fifth aspect of the preferred embodiment of the present invention can realize a function to correct the variation of pixel values due to partial sensitivity fluctuations peculiar to a sensor, such as scanning line noise or the like.

Contrast sometimes differs in each partial region due to sensitivity fluctuations caused by the above-mentioned causes. In a sampled image corrected by the fourth aspect of the biological information detecting device, for example, variation of pixel values due to sensitivity fluctuations for each scanning line occurs, thus although the striped noise of the background has been corrected, an image covered with a striped pattern unrelated to the biological information is obtained. In a sampled image irreversibly compressed based on discrete cosine transformations for each block, sometimes partial fluctuations occur in each block.

In this case, sensitivity can be unified according to the following equation.

$$A(x,y)=(f(x,y)-\mu(i,j))\times \sigma A/\sigma(i,j)+\mu A \quad \text{(the tenth equation)}$$

In the above equation, i and j are horizontal and vertical block locations, respectively. μ(x, y) and σ (x, y) are the mean value and standard deviation, respectively, of each block. A, μA and σA are the pixel value, mean value and standard deviation, respectively, of an image after correction.

The above equation is a correction equation in the case where a block process is performed. If μA and σA are the mean value μ and standard deviation σ, respectively, of a sampled image f (x, y), the difference of a value of pixel frequency distribution can be ideally eliminated before/after correction.

However, a sampled image is processed for each line like a scanning line, the following equation can be used.

$$L(x,y)=(f(x,y)-\mu(y))\times \sigma/\sigma(y)+\mu \quad \text{(the eleventh equation)}$$

In the above equation, μ(y) and σ(y) are the mean value and standard deviation, respectively, of the y-th line. L(x, y) and f(x, y) are the pixel value of a line after correction and the pixel value of a line before correction, respectively.

As described above, even by correcting partial variations, the pixel values of a background cannot be unified. Therefore, in order to unify the pixel values of a background, the following correction is performed using the pixel value of a background obtained by the method of the fourth aspect.

$$O(y)=\mu B-(\mu LB(y)-\mu(y))\times \sigma/\sigma(y)-\mu \quad \text{(the twelfth equation)}$$

$$L'(x,y)=L(x,y)+O(y) \quad \text{(the thirteenth equation)}$$

In the above equation, O(y), μB and μLB(y) are an offset for unifying the pixel values of the background of the y-th line, the mean value of a background image and the pixel value of a background of the y-th line, respectively. L and L' are the respective pixel values of a background before and after correction, respectively. The other terms are the same as described earlier.

Thus, partial sensitivity fluctuations can be corrected, and accordingly, a biological information image with the influences of scanning line noise and the like nullified can be detected.

If a region containing biological information and the region of background only are corrected conventionally when correcting partial sensitivity fluctuations, the contrast of the region of background only is intensified and the noise of the background region becomes the same as the degree of value of pixel.

The biological information detecting device in the sixth aspect can realize a function to determine whether biological information is contained in each partial region in order to prevent such noise from being intensified, and not to correct sensitivity fluctuations if no biological information is contained.

If the value of pixel variations of a partial region are less than a predetermined value, it is regarded that no biological information exists in the partial region. As value of pixel variations, a distribution or a standard deviation is used.

Figure 8:
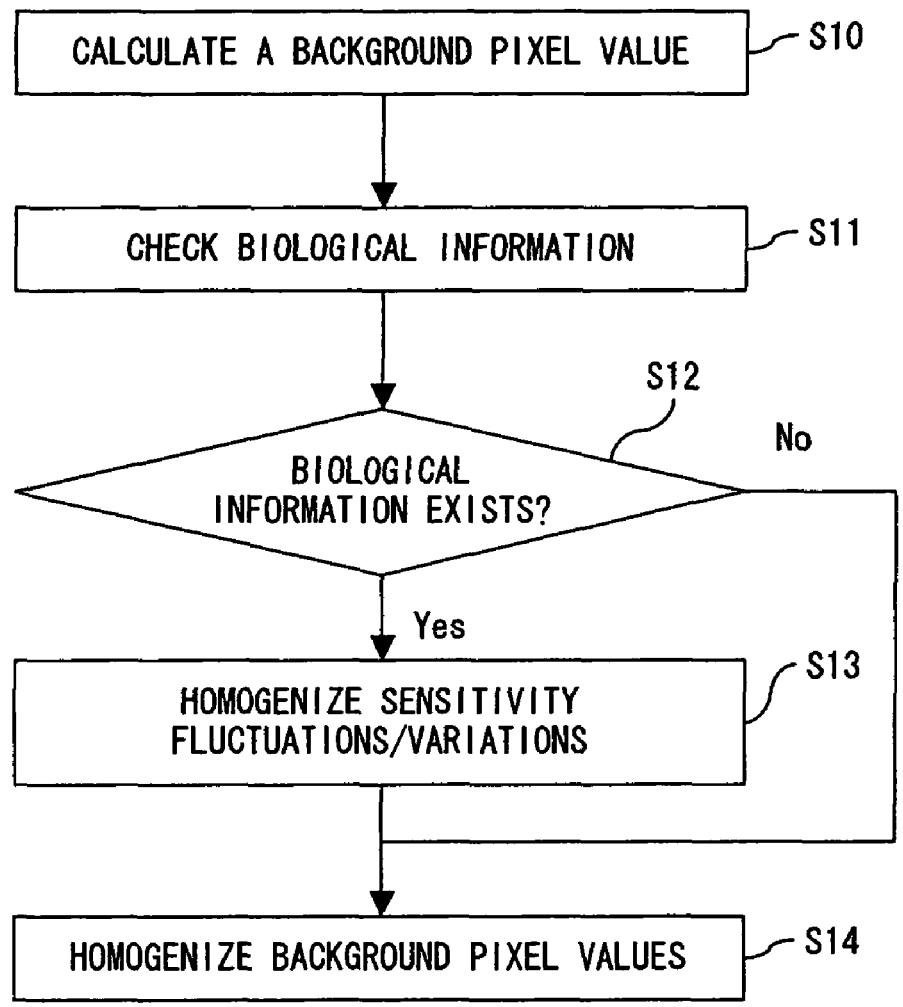
FIG. 8 is a flowchart showing the process of correcting sensitivity fluctuations.

FIG. 8 is a flowchart showing the process of correcting sensitivity fluctuations.

Firstly, the background pixel value of a partial region is estimated (step S10). Then, it is checked whether biological information exists in the partial region (step S11). In step S12, it is determined whether biological information exists. If it is determined that the biological information exists, the variations of sensitivity fluctuations are corrected and unified (step S13). Then, the background pixel values of the partial region are unified (step S14). If in step S12, it is determined that no biological information exists, the process proceeds to step S14, and the background pixel values of the partial region are unified.

Thus, by determining a background-only region, the sensitivity fluctuations of a partial region can be prevented from being excessively corrected.

The biological information detecting device in the seventh aspect of the preferred embodiment of the present invention can realize a function to adjust sensitivity by adjusting a threshold value such that the number of pixels can assume a predetermined ratio in the value of pixel frequency distribution of a biological information region coincide with a brightness based on the background brightness.

Figure 10:
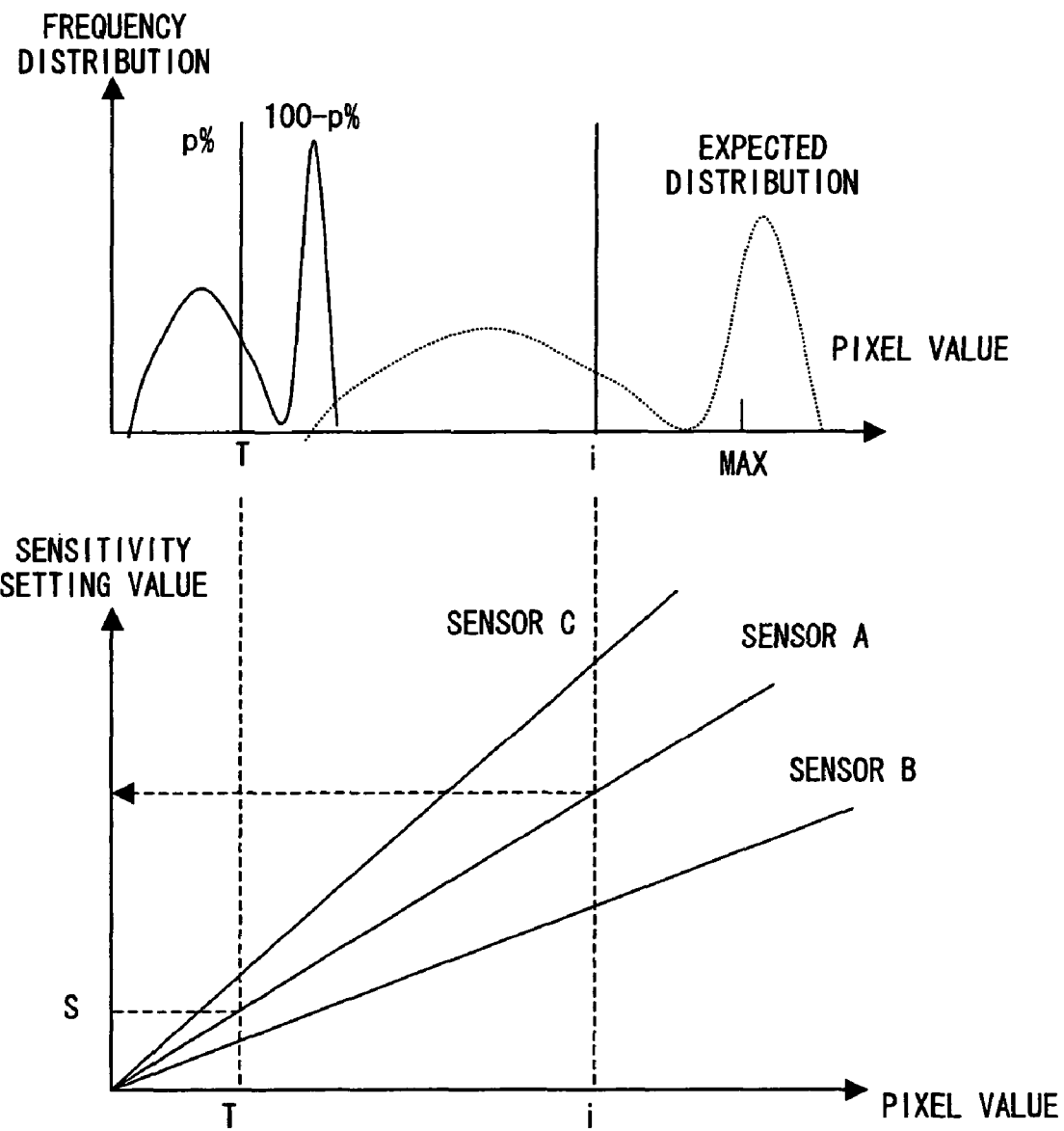

FIGS. 9 and 10 explain the seventh aspect of the preferred embodiment of the present invention.

For example, if even in the case of a sampled image whose contrast is low in a fingerprint image, like the left-most histogram shown in FIG. 9 or whose contrast is high in a fingerprint image, like the right-most histogram shown in FIG. 9, the respective number of pixels in the ridges and valleys assumes a predetermined ratio with a predetermined threshold value as a boundary, the respective influences of noise and stains can be nullified. Accordingly, the ridges and tagwegs can be easily separated from each other. If the biological information input unit comprises a sensitivity adjustment mechanism, and if the relationship between the background brightness and the sensitivity setting value is proportional, an appropriate sensitivity setting value can be calculated according to the following equation.

$$S_n=S\times i/T \quad \text{(the fourteenth equation)}$$

In the above equation, T, S, i and $S_n$ are a threshold value for dividing the number of pixels by a predetermined ratio (in FIGS. 9 and 10, the number of pixels is divided into p % and (100−p) %), a sensitivity setting value before adjustment, a threshold value after adjustment and a sensitivity setting value to be calculated, respectively.

Therefore, if there is an individual difference in the sensitivity of the biological information input unit, a sensitivity setting value can be determined without any influence of the individual differences in sensitivity as shown in FIG. 10.

By using T, the width of the dynamic range can be used without losing biological information.

If i is set smaller than the background brightness, excessively high contrast by which ridge information is saturated can be reduced. Furthermore, if in the case of a contact type biological information input unit, a sensitivity setting value is gradually reduced after being improved once, the influences of patterns other than biological information, such as sweat and the like can be reduced.

The biological information detecting device in the eighth aspect of the preferred embodiment of the present invention can realize a function to keep the value of pixel contrast of a biological information region constant.

The background brightness and minimum value of a biological information region are made to coincide with the maximum and minimum values of a quantization level, respectively, as follows.

$$f'(x,y)=(f(x,y)-fB)\times(\max-\min)/(fB-fmin)+\max \quad \text{(the fifteenth equation)}$$

In the above equation, fB, fmin, max and min are the background brightness of a biological information region, the minimum pixel value of the biological information region, the maximum quantization level value and the minimum quantization level value, respectively. Alternatively, fmin can also be defined as follows, using the mean value and standard deviation of a biological information region.

$$fmin=\mu-c\times\sigma(c>1.0) \quad \text{(the sixteenth equation)}$$

Alternatively, in order to prevent saturation due to excessive emphasis, max and min can also be made somewhat smaller and larger, respectively. Since f' (x, y) is a pixel value obtained by transforming f(x, y) according to the fifteenth equation, it can be transformed in such a way that of the outputs of a sensor, pixel values ranging from fmin up to fB can be located between max and min.

Since only the information of a biological information region is used, as described above, ranges other than the biological information region are not affected by unnecessary information, such as stains and the like. Accordingly, an output result can be stabilized.

The biological information detecting device in the ninth aspect of the preferred embodiment of the present invention can realize a function to determine the state of a sampled image, based on the mean value and standard deviation of a biological information region.

Figure 11:
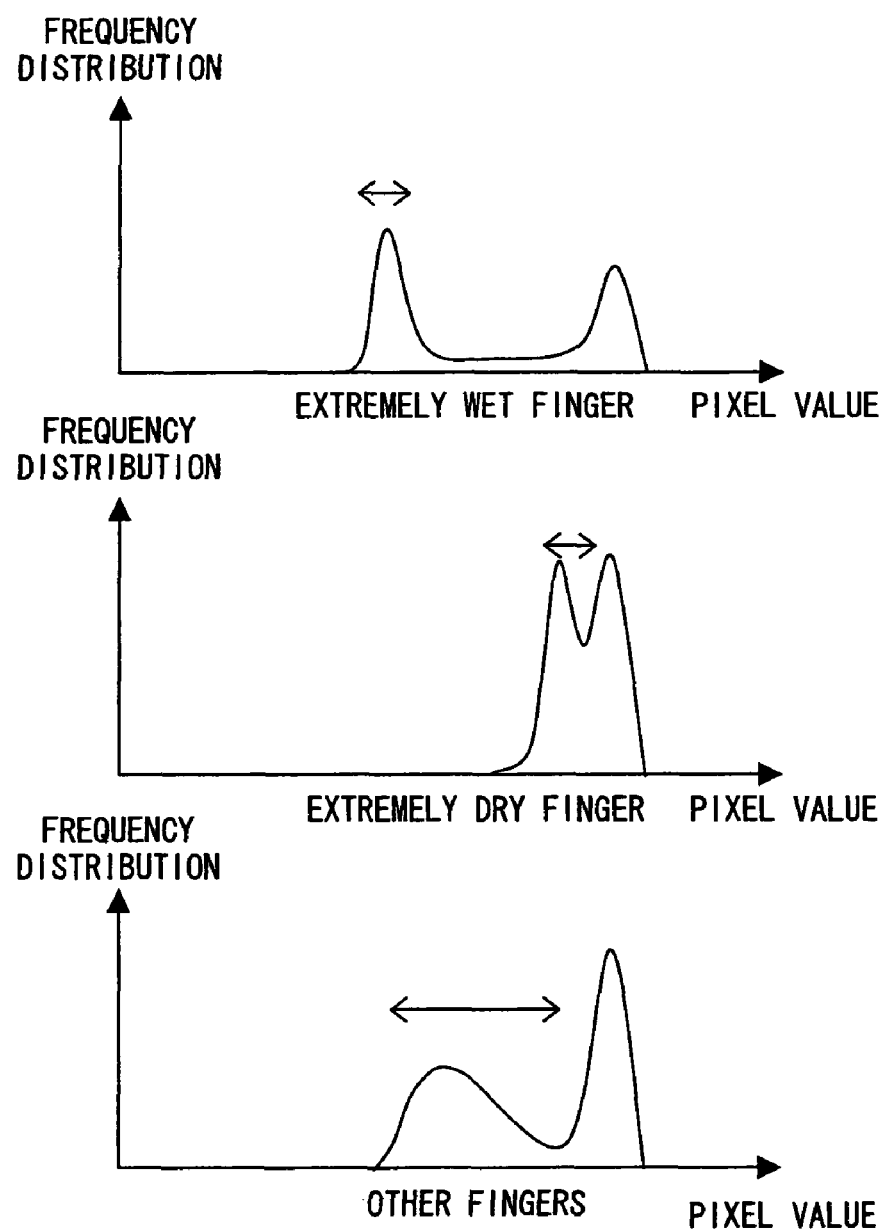
FIG. 11 explains the ninth aspect of the preferred embodiment of the present invention.

FIG. 11 explains the ninth aspect of the preferred embodiment of the present invention.

For example, in the biological information input unit for outputting a value of pixel value according to a distance from a sensor, the distance decreases as a pixel value decreases, and the distance increases as the pixel value increases. Since as shown in FIG. 11, the epidermis is smooth, pixel values tend to strongly decrease in the case of a wet finger, and conversely tend to increase in the case of a dry finger. In the case of an extremely wet finger, a distribution tends to collect in a place where a pixel value is small, and in the case of an extremely dry finger, a distribution tends to collect in a place where a pixel value is large. However, as for a background part other than the biological information region, a distribution tends to collect in a place where a pixel value is the highest. Therefore, the background part must be eliminated. If the standard deviation of a range extracted as a biological information region is equal to or less than the standard deviation of a background image, it can be regarded that no biological information exists in a sampled image.

Therefore, by the mean value and standard deviation of a biological information region, the state of the biological information can be determined.

The biological information detecting device in the tenth aspect of the preferred embodiment of the present invention can realize a function to determine the state of a sampled image even when the sensitivity setting value is variable.

FIG. 12 explains the tenth aspect of the preferred embodiment of the present invention.

If as shown in FIG. 12, a sensitivity setting value differs, for example, the correlation between the difference of a value of pixel distribution between wet and dry fingers, and the status of a finger is lost. Therefore, the pixel value of the sampled image is normalized as follows.

$$f'(x,y)=f(x,y)/S \quad \text{(the seventeenth equation)}$$

In the above equation, S is the sensitivity setting value of a sampled image.

Thus, even when a sensitivity setting value differs, the state of a sampled image can be accurately determined.

The biological information detecting device in the eleventh aspect of the preferred embodiment of the present invention can realize a function to extract a biological information region.

FIG. 13 explains the eleventh aspect of the preferred embodiment of the present invention.

If the pixel value range of noise or a stain overlaps the pixel value range of biological information in a sampled image, a biological information region is not accurately extracted as shown in FIG. 13. In this case, biological information is extracted after the noise or stain is eliminated. By eliminating noise or stains before extracting biological information, biological information can be accurately extracted.

The biological information device in the twelfth aspect of the preferred embodiment of the present invention can realize a function to extract a biological information region.

Firstly, sensitivity variations are eliminated in a sampled image. Then, a region containing biological information is extracted. Thus, by eliminating sensitivity variations in a sampled image, biological information can be accurately extracted.

The biological information extraction device in the thirteenth aspect of the preferred embodiment of the present invention can realize a function to extract a biological information region.

Firstly, sensitivity fluctuations are eliminated in a sampled image. Then, a region containing biological information is extracted. Thus, by eliminating sensitivity fluctuations in a sampled image, biological information can be accurately extracted.

The biological information detecting device in the fourteenth aspect of the preferred embodiment of the present invention can realize a function to determine the state of a living body in a sampled image.

FIG. 14 is a flowchart showing the process of the fourteenth aspect of the preferred embodiment of the present invention.

Firstly, if a background image is sampled (step S20) a background image is detected as the initialization process (step S21). Then, an image containing biological information is sampled (step S22), and the sensitivity variations of the sampled image are corrected using the background image (step S23). Then, partially generated sensitivity fluctuations are corrected (step S23). Then, a biological information region is extracted (step 24). The state of a living body is determined based on brightness and standard deviation of the extracted biological information region (step S25).

By correcting sensitivity fluctuations after correcting sensitivity variations, the background brightness in each partial region can be accurately calculated and the sensitivity fluctuations can be corrected in detail. By using a biological information region without the influence of noise, the state of a living body can be accurately determined.

The biological information detecting device in the fifteenth aspect of the preferred embodiment of the present invention can realize a function to determine the state of a living body in a sampled image.

Figure 15:
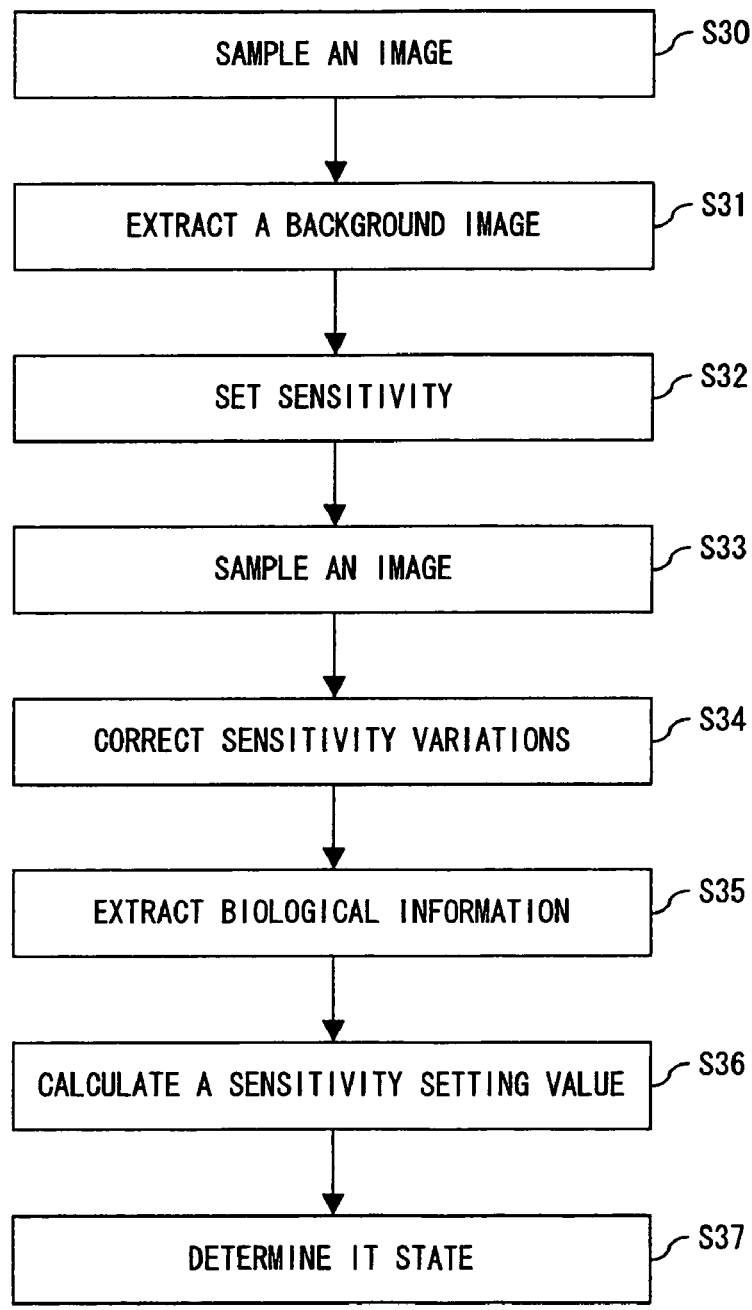
FIG. 15 is a flowchart showing the process of the fifteenth aspect of the preferred embodiment of the present invention.

FIG. 15 is a flowchart showing the process of the fifteenth aspect of the preferred embodiment of the present invention.

Firstly, a background image is sampled (step S30) Then, a background image is detected as the initialization process (step S31). In this case, the sensitivity setting value is stored (step S32). Then, an image containing biological information is sampled (step S33), and the sensitivity variations of the sampled image are corrected using the background image (step S34). Then, partially generated sensitivity fluctuations are corrected (step S34). Then, a biological information region is extracted (step 35). Then, a sensitivity setting value to be used when sampling a subsequent image from the extracted biological information region is calculated (step S36). Then, the brightness and standard deviation of the extracted biological information region are calculated, and the pixel value of the sampled image is normalized using the sensitivity set when sampling an image (step S37).

By calculating a biological information region from which noise is eliminated by correction, an accurate sensitivity setting value can be obtained. Since a parameter can be normalized using an accurate sensitivity setting value, highly accurate determination becomes possible.

The biological information detecting device in the sixteenth aspect of the preferred embodiment of the present invention can realize a function to determine the state of a living body in a sampled image.

Firstly, the number of differential pixels with an immediately previous sampled image is calculated. If this number of pixels exceeds a predetermined value, it is determined that biological information is not certained and it is defined that the sampled image is in an unstable state. The predetermined value is calculated based on the number of pixels of a sampled image in the biological information input unit.

By defining such an unstable state, it is never falsely determined that a finger is placed even in a biological information input unit so highly sensitive that even water vapor can be detected. Therefore, accurate determination becomes possible.

The biological information detecting device in the seventeenth aspect of the preferred embodiment of the present invention can realize a function to determine the state of a living body in a sampled image.

For example, if sweat or a residual fingerprint is attached to the biological information input unit, sometimes the pixel value of the sweat or residual fingerprint decreases due to water vapor as a living body approaches, and the range of the pixel value of the sweat or residual fingerprint overlaps the range of the pixel value of biological information. If sweat or a residual fingerprint is reflected on a background image from the beginning, it can be corrected by the sensitivity variation correction unit. However, sometimes although it cannot be reflected on the background image, when a living body approaches, the respective pixel value of sweat or a residual fingerprint decreases, and the residual fingerprint comes to the surface. In this case, the following process is performed.

Figure 16:
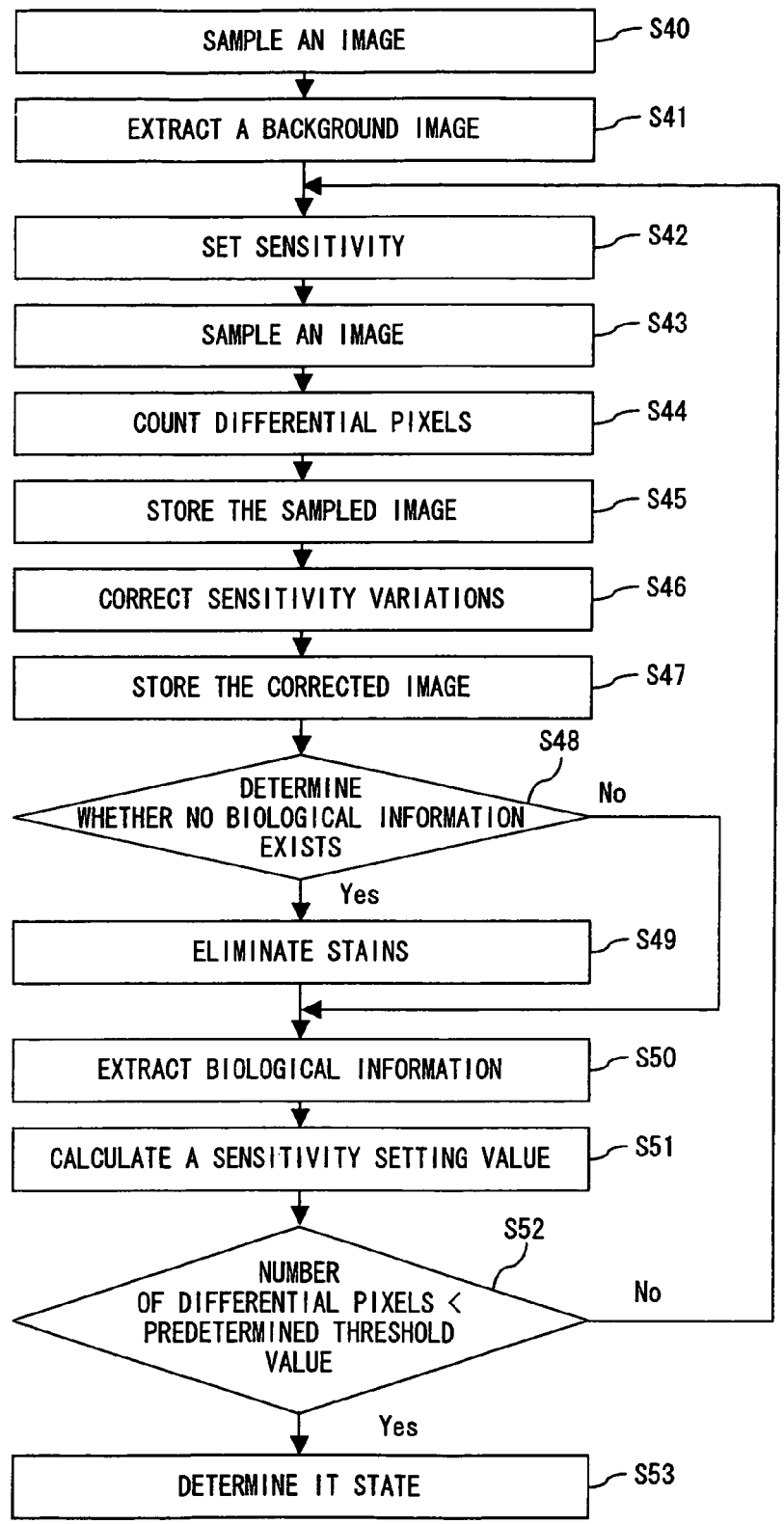
FIG. 16 is a flowchart showing the process of the seventeenth aspect of the preferred embodiment of the present invention.

FIG. 16 is a flowchart showing the process of the seventeenth aspect of the preferred embodiment of the present invention.

Firstly, an image is sampled (step S40). Then, a background image is detected as the initialization process (step S41). In this case, the sensitivity setting value is stored (step S42). Then, an image is sampled (step S43), and the number of pixels differing with an immediately previously sampled image is calculated (step S44). In this case, the then sampled image is stored (step S45). Then, the sensitivity variations of the sampled image are corrected, using the background image (step S46). Then, partially generated sensitivity fluctuations are corrected (step 46). In this case, only the corrected image is stored (step S47). In step S48, it is determined whether biological information is contained in the biological information region of the immediately previously sampled image. If it is determined that no biological information exists in the biological information region of the immediately previously sampled image, the process proceeds to step S50. If in step S48 it is determined that biological information exists, the influence of a stain, such as a residual fingerprint or the like is nullified (step S49), and the process proceeds to step S50. Then, the biological information region is extracted (step S50). Then, a sensitivity setting value to be used for an image to be subsequently sampled from the biological information region of the stored sampled image before correction is calculated (step S51). Then, the brightness and standard deviation of the biological information region are calculated, and the pixel value of the sampled image is normalized using the sensitivity setting made when sampling the image. Then, it is determined whether the differential pixel value of the immediately previously normalized image exceeds a predetermined threshold (step S52). If the differential pixel value exceeds the predetermined value, the process returns to step S42 without determining the sampled image. Otherwise, the mean value and standard deviation of the biological information region of the corrected image, and the pixel value of the sampled image are normalized using the sensitivity setting value. A state is determined by this normalized parameter (step S53). If it is determined that no biological information exists, the corrected image is stored.

Thus, even when sweat or a residual fingerprint comes to the surface due to water vapor or when new sweat or a residual fingerprint is attached, these can be detected. By eliminating these, biological information can be accurately determined.

The biological information detecting device in the eighteenth aspect of the preferred embodiment of the present invention can realize a function to determine the state of a living body in a sampled image.

If sweat or a residual fingerprint is attached, sometimes a sampled image containing biological information and one not containing it cannot easily be distinguished from each other.

Thus, if a living body is clearly wet, conditions for determining whether biological information is contained are loosened.

For example, a criterion in the background image detecting unit, for determining that there is no biological information is loosened. Alternatively, a counting condition in counting the number of differential pixels with the immediately previous image in the biological information determination unit is intensified. Alternatively, a criterion of the standard deviation in the biological information determination unit, for determining that there is no biological information is loosened.

Thus, the biological information of a living body that is always wet can be recognized.

The biological information detecting device in the nineteenth aspect of the preferred embodiment of the present invention can realize a function to correct the sensitivity variations of a sampled image.

Although up to this point it is assumed that a background image can be extracted, there is a possibility that a biological information input unit with extreme sensitivity variations due to variations in manufacturing or oversight in inspection may be used. In this case, sometimes a sampled image containing biological information and one not containing it cannot easily be distinguished from each other. Therefore, if no sensor for detecting the existence/non-existence of a living body is provided separately from the biological information input unit, a background image cannot be extracted. Accordingly, in this case, biological information cannot be extracted. In this case, if conditions for extracting a background image are loosened, an image is corrected as sensitivity variations when a dry living body is input at the time of extraction of a background image. In that case, the background image cannot be extracted.

Therefore, if a living body is clearly dry, an image sampled beforehand is used as a background image instead of extracting it at the time of initialization.

Thus, even in a biological information input unit with extreme sensitivity variations, biological information can be accurately recognized.

FIG. 17 shows the block configuration diagram of the biological information extraction device in the preferred embodiment of the present invention.

The biological information detecting device of the preferred embodiment of the present invention comprises a biological information input unit 20 for visualizing biological information, a background image detecting unit 21 for detecting a background image, a sensitivity variation correction unit 22 for correcting sensitivity variation in a biological information input unit using the ratio of a sampled image to a background image, a sensitivity fluctuation correction unit 23 for correcting the sensitivity fluctuations contained in a sampled image, a biological information region extraction unit 24 for correcting partial sensitivity fluctuations by unifying the value of pixel levels of a background in each partial region, a sensitivity adjustment unit 27 for setting sensitivity in such a way that a pixel value of the number of pixels which assumes a predetermined ratio in the value of pixel frequency distribution of a biological information region can coincide with the pixel value of a background image, a value of pixel correction unit 26 for correcting value of pixel in such a way that the pixel value and its minimum value of the background region of a biological information region can become the upper limit value of a maximum quantization level and the lower limit value of a minimum quantization level, respectively, and an image determination unit 25 for determining the state of a sampled image, based on a value obtained by normalizing the mean value and standard deviation of a biological information region by the ratio of a sensitivity value set in the biological information input unit.

The operating process of the above-mentioned biological information extraction device is described below. Here it is assumed that a sensitivity setting value and a pixel value are proportional. However, if the relationship between the sensitivity setting value and pixel value is clear, the proportional relationship can also replaced with an actual relationship between the sensitivity setting value and pixel value.

Figure 18:
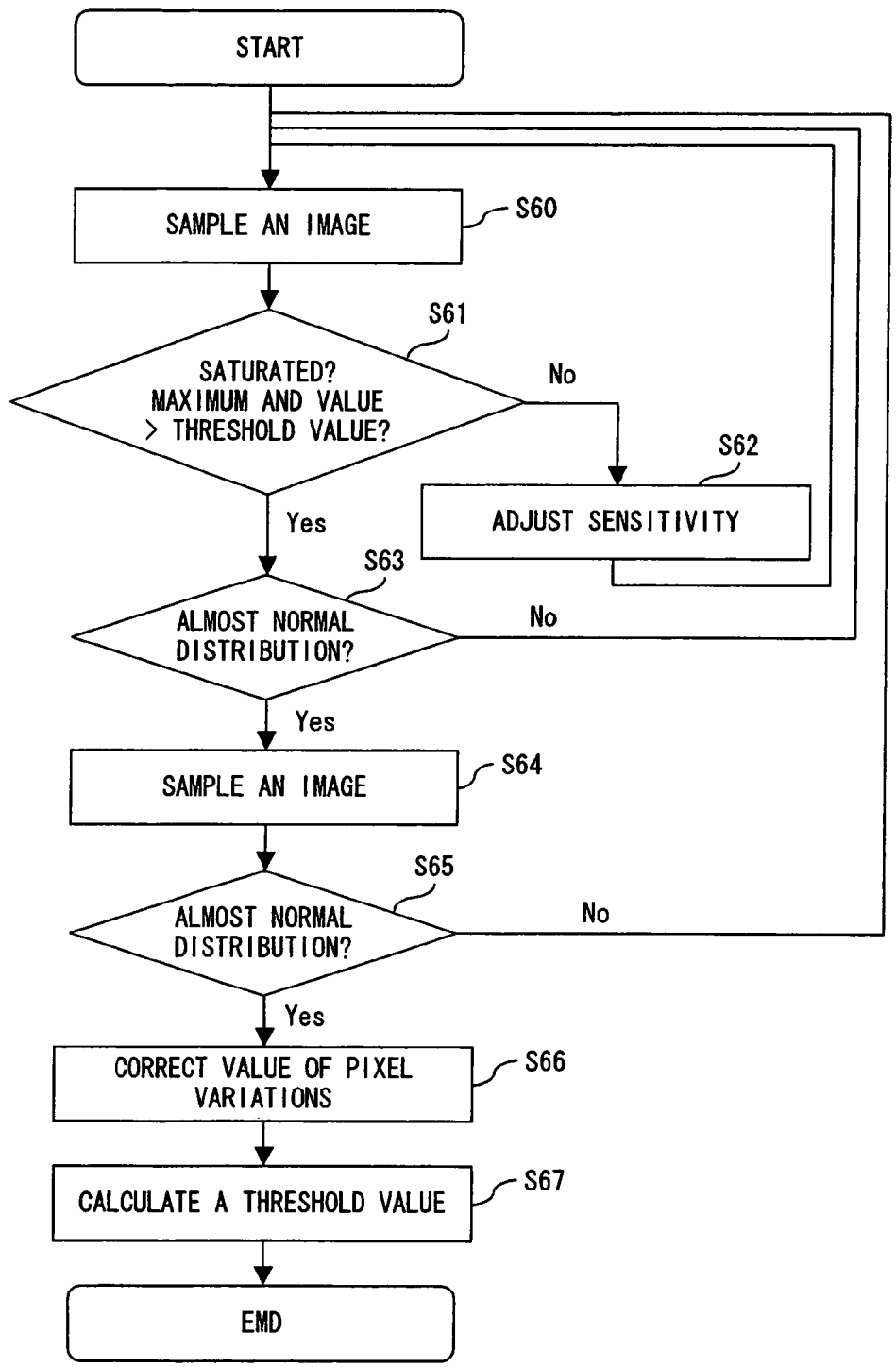
FIG. 18 is a flowchart showing an initialization process.

FIG. 18 is a flowchart showing the initialization process.

Firstly, an image is sampled (step S60), and it is determined whether the sensitivity setting value of the biological information input unit is appropriate. If the pixel value of a background image is saturated, information for correcting sensitivity variations is lost. Therefore, it is determined whether the sampled image is saturated (step S61). Whether the sampled image is saturated is determined based on a threshold value calculated on the basis of the sampled image size of the number of pixels distributed between a maximum quantization level and a minimum quantization level in the biological information input unit (step S61). In this case, the degeneracy by quantization of a pixel value decreases as a background pixel value increases. Therefore, it can also be determined whether the maximum value Bmax of a sampled image is larger than a predetermined threshold value Th. Since there is a possibility that the maximum value may equal the maximum quantization level due to noise, the maximum value is defined as follows.

$$B\text{max} = \mu B + 3 \times \sigma B \qquad \text{(the eighteenth equation)}$$

If the pixel value of the background image is saturated or if Bmax is smaller than the predetermined threshold value, sensitivity is adjusted (step S62). If the pixel value of the background image is saturated at the maximum quantization level, the sensitivity setting value is set in the direction of decreasing the pixel value of the background image. If it is saturated at the minimum quantization level, the sensitivity setting value is set in the direction of increasing the pixel value of the background image. If Bmax is smaller than the predetermined threshold value, the sensitivity setting value is calculated as follows.

$$SB = S \times Th / B\text{max} \qquad \text{(the nineteenth equation)}$$

Then, it is determined whether biological information exists in the sampled image.

If the pixel value of the background image is not saturated and if Bmax is larger than the predetermined threshold value, it is determined whether the sampled image is close to a normal distribution (step S63). In order to determine whether the sampled image is close to a normal distribution, the skewness and kurtosis are used.

However, since determination by the skewness and kurtosis is not sufficient, it is also determined whether the mean value and the median are sufficiently close. If it is determined that the sampled image does not assume an almost normal distribution, the process is suspended. Alternatively, the process returns to the starting point and the initialization process is attempted again (the process returns to step S60). If it is determined that the sampled image assumes an almost normal distribution, it is regarded that the sampled image contains no biological information.

Then, the background image is verified. The verification is made by re-sampling an image (step S64) and similarly checking whether the sampled image assumes an almost normal distribution (step S65).

Lastly, the value of pixel variations of the two sampled images are corrected (step S66). The mean value and standard deviation of this corrected image are used as a background pixel value and a threshold value for biological information existence determination in the subsequent processes (step S67).

Figure 19:
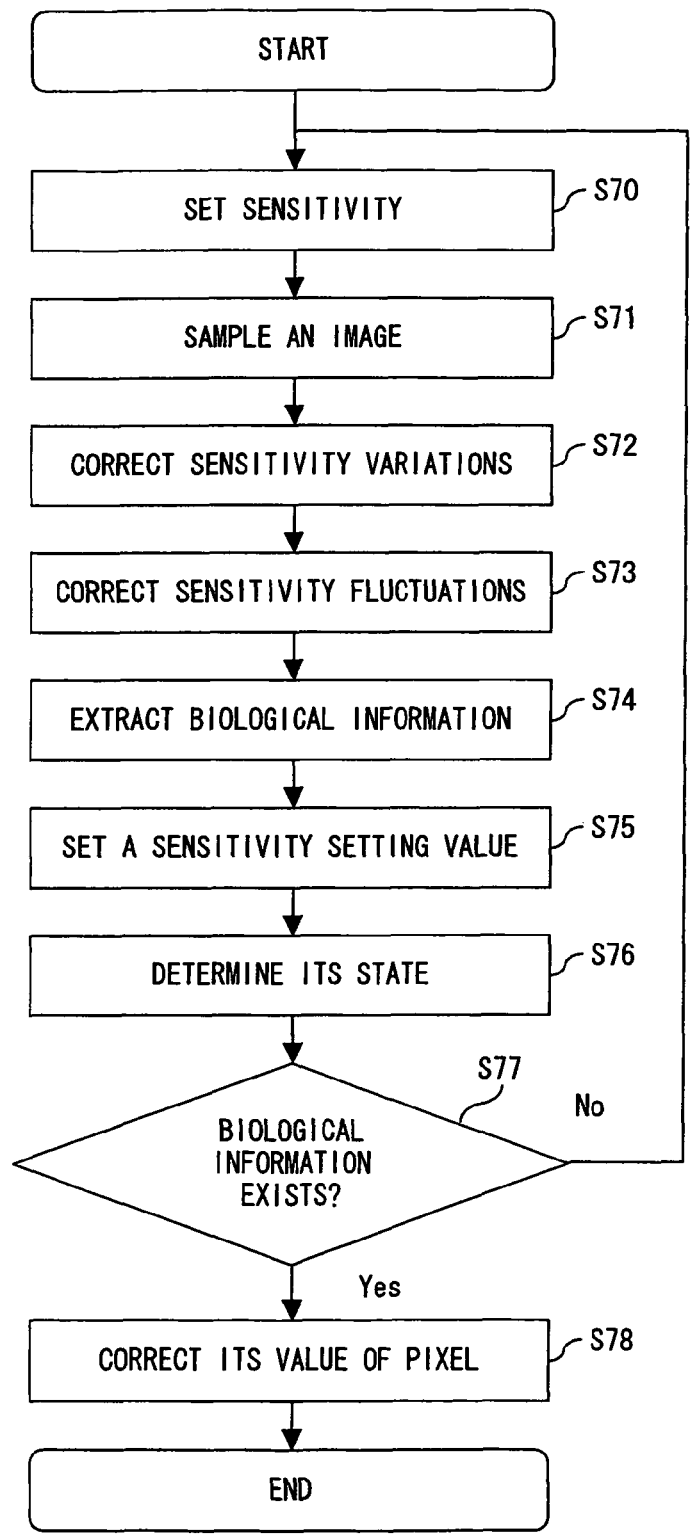
FIG. 19 is a flowchart showing a biological information detecting process.

FIG. 19 is a flowchart showing the biological information extraction process. FIG. 20 shows an example of the correction of sensitivity fluctuations.

Firstly, the sensitivity is set using a sensitivity setting value provided to the biological information input unit (step S70).

Then, an image is sampled (step S71), and the sensitivity variations of the sampled image are corrected using a background image. Furthermore, partially generated sensitivity fluctuations are corrected (step S73). One example of this is shown in FIG. 20.

Then, biological information is extracted from an image whose noise and stains have been corrected (step S74).

The sensitivity adjustment unit calculates a sensitivity setting value used when sampling a subsequent image from a range containing only biological information of the sampled image, obtained by the biological information extraction unit (step S75).

Then, the state determination unit calculates the statistical quantities of a range of the corrected image, containing only biological information and determines its state (step S76). Firstly, a standard deviation normalized by the sensitivity setting value NS is used to determine that no biological information exists (step S77). NS is calculated as follows.

$$NS=(\sigma/\mu)\times(SB/S) \quad \text{(the twentieth equation)}$$

In the above equation, $\sigma$, $\mu$, S and SB are the standard deviation of the range of a corrected image, containing only biological information, the mean value of the range of a corrected image, including only biological information, the sensitivity setting value of a sampled image and the sensitivity setting value of a background image, respectively.

If NS is sufficiently small, it is regarded that no biological information exists in the sampled image. In this case, a reference value for determining that NS is sufficiently small is calculated as follows.

$$R=\sigma B/\mu B \quad \text{(the twentieth-first equation)}$$

In the above equation, $\sigma B$ and $\mu B$ are the standard deviation and mean value, respectively, of a background image. R is the SN ratio of a background image. A background image for calculating $\sigma B$ can also be one obtained by correcting a pattern other than biological information, such as sensitivity variations or the like. For example, there is a possibility that the stain of a sensor or a residual fingerprint may remain in a background image whose sensitivity variations have been corrected. In this case, if the $\sigma B$ of the corrected background image is used, determination such that the stain of a sensor or the residual fingerprint may not be contained is possible.

The state determination unit determines whether biological information contained in a sampled image is dry/wet/favorable. As described earlier, if it is dry, a feature that a pixel value is large and its distribution is condensed is utilized. If it is wet, a feature that a pixel value is small and its distribution is condensed is utilized.

In order to compare the size of a pixel value, a value obtained by normalizing the mean value of the range of the corrected image, containing only biological information, using the sensitivity setting value, as follows, is used.

$$NA=\mu/\mu B\times(SB/S) \quad \text{(the twentieth-second equation)}$$

A state is classified using a table using this NA and the above-mentioned NS.

FIG. 21 shows a typical example of the table for classifying states.

In FIG. 21, if NS is equal to or smaller than R, it is determined that no image exists. If NS is located between R and 2R and if NA is small it is determined that the sampled image is of a wet subject. If NS is located between R and 2R and if the NA is close to 1 it is determined that the sampled image is of a dry subject. If NS is located between 3R and 2R, a range for determining whether the sampled image is of a wet or dry subject, according to an NA value is narrowed. If NS is located between 3R and 2R and if NA is around 0.5 it is determined that the acquisition state of biological information is favorable.

If it is determined as a result of the status determination that biological information exists, value of pixel correction is applied to the sampled image whose sensitivity variations and fluctuations have been corrected (step S78), and the image is output. However, if contrast is emphasized by the value of pixel correction when it is determined that the sampled image is of a dry subject, there is a possibility that the contrast may be excessively emphasized. Therefore, value of pixel correction can also be applied to an offset alone.

Figure 22:
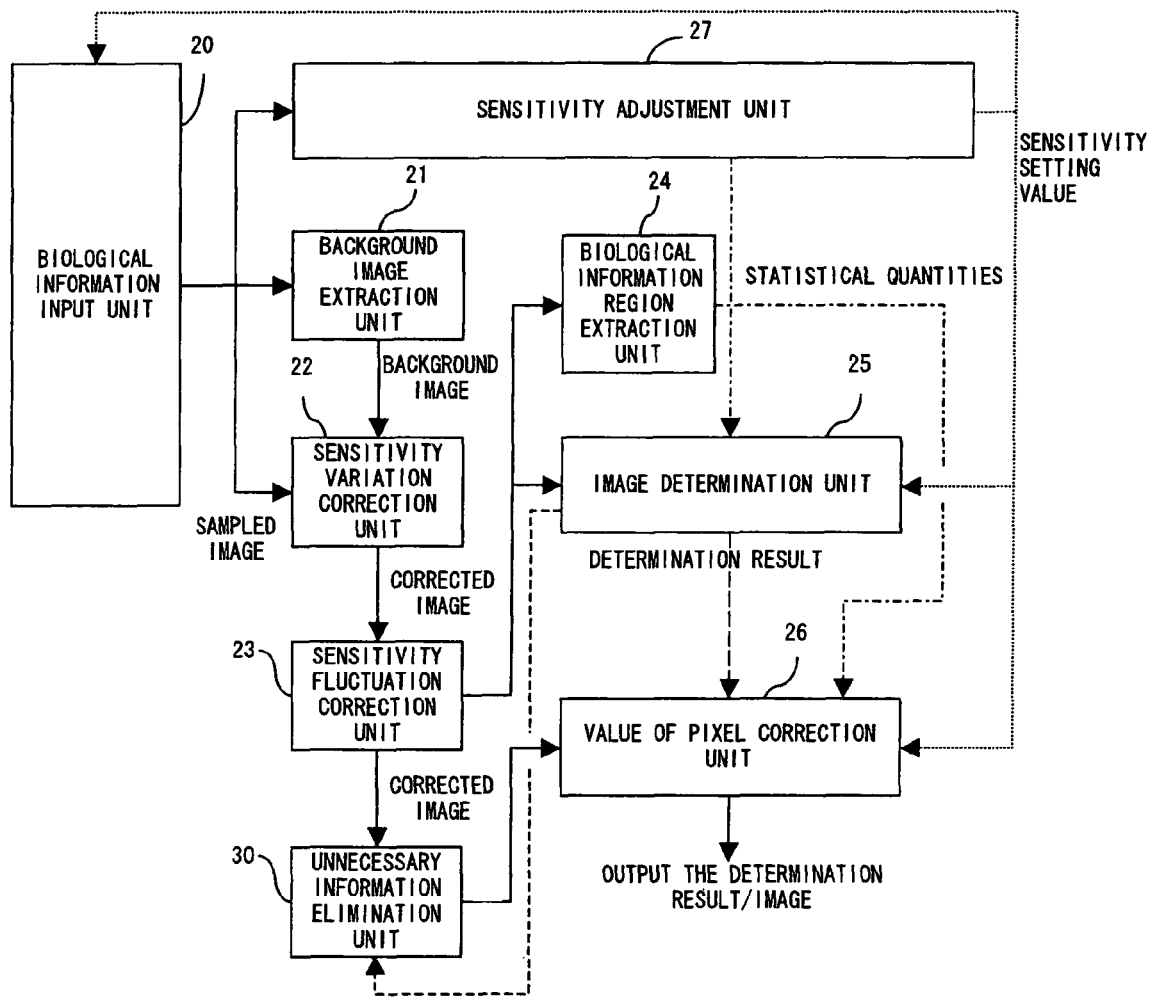
FIG. 22 shows the second configuration of the biological information detecting device in the preferred embodiment of the present invention.

FIG. 22 shows the second configuration of the biological information detecting device in the preferred embodiment of the present invention.

In FIG. 22, the same reference numerals are attached to components the same as those in FIG. 17, and their descriptions are omitted here.

The second configuration further comprises an unnecessary information elimination unit 30 for eliminating sweat or a residual fingerprint as unnecessary information if sweat or a residual fingerprint is reflected in the image whose sensitivity variations and sensitivity fluctuations as shown in FIG. 20 have been corrected in the earlier-mentioned configuration.

Figure 23:
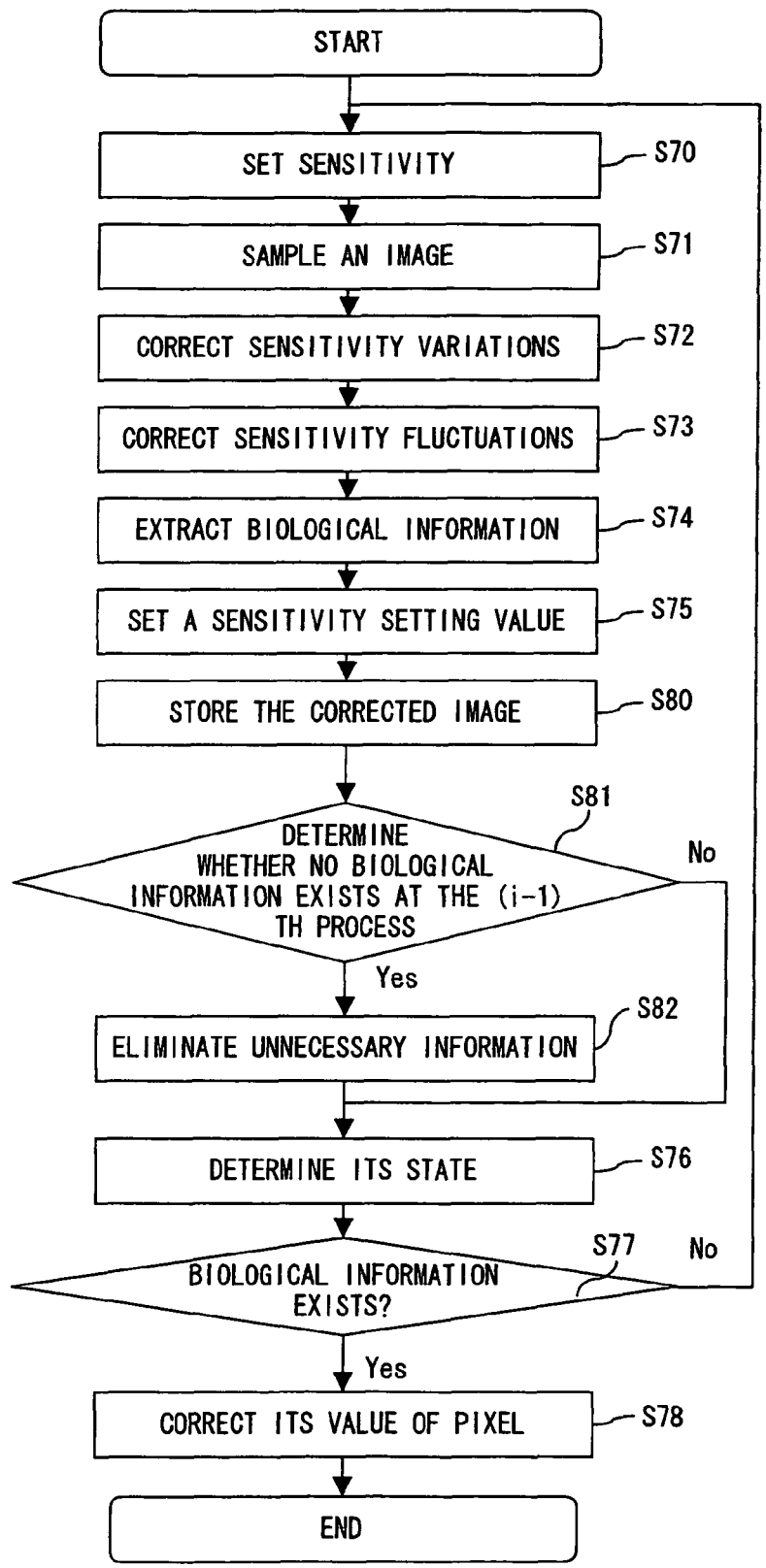
FIG. 23 is a flowchart showing the operation of the second configuration.

FIG. 23 is a flowchart showing the operation of the second configuration.

In FIG. 23, the same step numbers are attached to steps the same as in FIG. 19 and their descriptions are omitted here.

FIG. 23 can be obtained by adding a process for eliminating unnecessary information, such as sweat, residual fingerprints and the like, from an image whose sensitivity variations and fluctuations as shown in FIG. 20 in the earlier-mentioned configuration have been corrected, to the operation process shown in FIG. 19, and the process up to the calculation of the sensitivity setting value (step S75) is the same as in FIG. 19.

In step S80, the corrected image is stored, and in step S81, in the (i−1)th process, that is, a corrected image $f'_{i-1}$ that is determined not to contain biological information in an immediately previous loop, there is a high possibility that sweat or a residual fingerprint may be reflected. Therefore, the difference between the corrected images $f'_{i-1}$ and $f'_i$ is calculated as follows.

$$f''_i(x,y)=f'_i(x,y)-(f'_{i-1}(x,y)-Bf'_{i-1}) \quad \text{(the twenty-third equation)}$$

In the above equation, $Bf'_{i-1}$ is a background pixel value of $f'_{i-1}(x, y)$.

For subsequent state determination (step S77), a stored corrected image from before the unnecessary information elimination is used. The subsequent process is the same as in FIG. 19. If in step S81 it is not determined that biological information exists, the process skips step S82 and proceeds to step S76.

FIG. 24 shows the third configuration of the biological information detecting device in the preferred embodiment of the present invention.

In FIG. 24, the same reference numerals are attached to the same components as in FIG. 17, and their descriptions are omitted here.

The biological information detecting device in the third configuration can be obtained by adding a state input unit 35 for selecting and inputting the state of biological information, to the configuration shown in FIG. 17.

Figure 25:
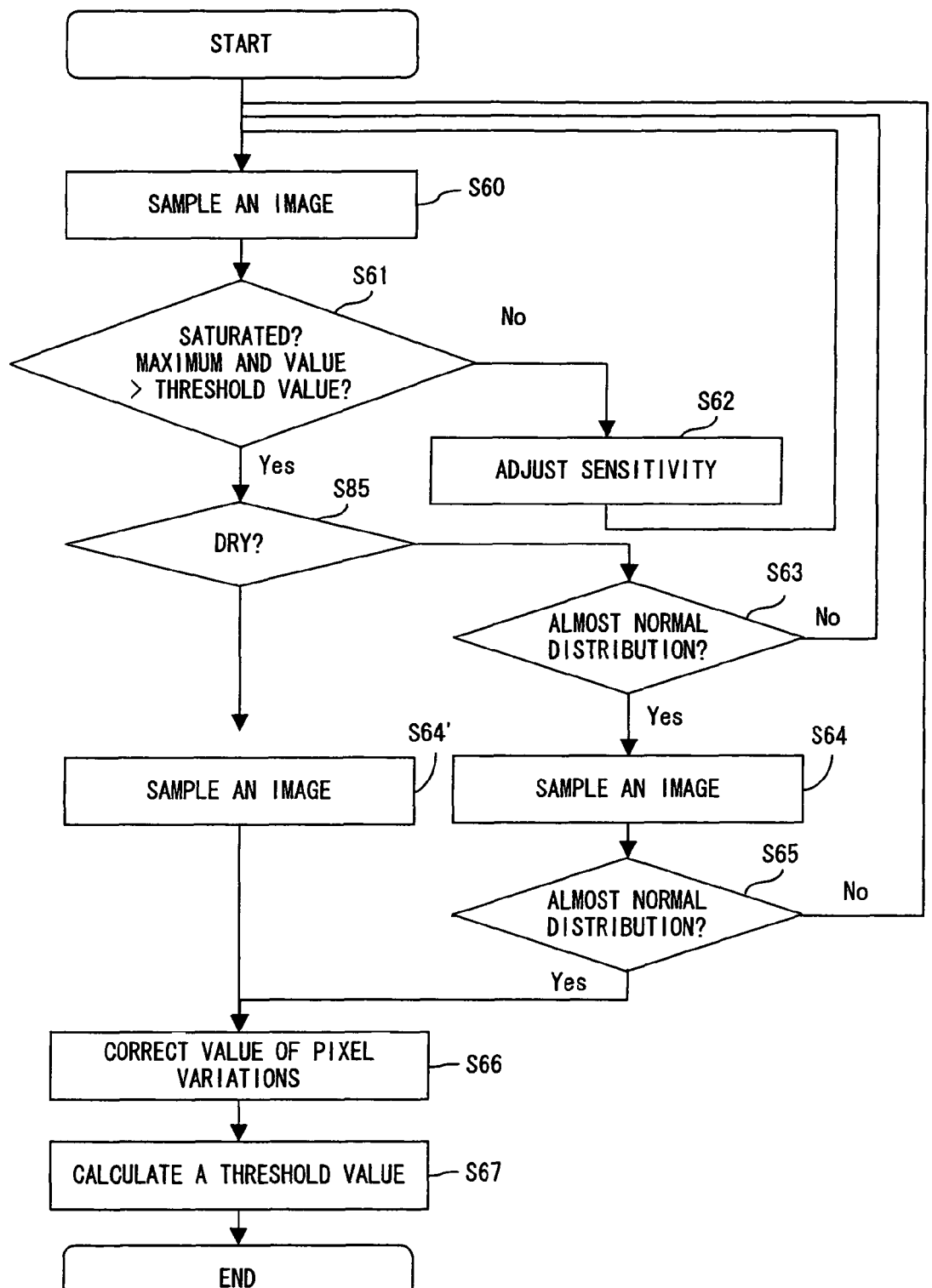
FIG. 25 is a flowchart showing the operation of the third configuration.

FIG. 25 is a flowchart showing the operation of the third configuration.

In FIG. 25, the same step numbers are attached to the same steps as in FIG. 18 and their descriptions are omitted here.

FIG. 25 can be obtained by omitting the determination of an almost normal distribution from the operation process shown in FIG. 18 since the state input unit 35 inputs a state (step S58), and adding the remaining processes shown in FIG. 18.

In the third configuration, since the state input unit 35 inputs a state, the table shown in FIG. 21 is modified. In particular, if a sampled image is clearly dry, the table is modified in such a way as not to determine whether it is wet.

As described above, according to the present invention, a biological information region can be successfully extracted from an image sampled by a biological information input unit as a region containing biological information. Even when an image sampled by the biological information input unit contains sensitivity variations or partial sensitivity fluctuations, water vapor, or non-biological information, such as sweat, a residual fingerprint or the like, these can be successfully corrected. Then, the biological information region can be accurately extracted after correction. Since a sensitivity setting value is calculated based on a range containing only biological information, the influence of the background is small, and an accurate sensitivity setting value can be successfully corrected. Then, by using a sensitivity setting value calculated based on a range containing only biological information and statistical quantities calculated based on a range containing only biological information, using the corrected image, the existence/non-existence of biological information and the state of a living body in the sampled image can be accurately determined. Then, by correcting the value of pixel of the extracted biological information, using a sensitivity setting value calculated based on a range containing only biological information and statistical quantities calculated based on a range containing only biological information, using the corrected image, the value of pixel of the sampled image can be stably corrected. Accordingly, the present invention greatly contributes the technical improvement of a biological information detecting device.

What is claimed is:

1. A biological information detecting device, comprising:
    a sensor configured to sample biological information;
    a biological information region extraction unit configured to calculate statistical quantities, based on a value of pixel distribution of an image sampled by the sensor, and to extract a region containing biological information, based on the statistical quantities; and
    a partial sensitivity fluctuation correction unit configured to correct partial sensitivity fluctuations by homogenizing the value of pixel levels of a background in each partial region of the sampled image, wherein
    partial sensitivity fluctuations for each partial region are corrected by homogenizing the value of pixel levels of the background after homogenizing a mean value and standard deviation of the respective partial region when the standard deviation value of the respective partial region is not smaller than a standard deviation value of a total image whose sensitivity variations of each background image has been corrected, and, if the standard deviation value of the respective partial region is smaller than a standard deviation value of the total image whose sensitivity variations of each background image has been corrected, the partial sensitivity fluctuations for the respective partial region are not corrected by homogenizing standard deviation values for the respective partial region.

2. The biological information detecting device according to claim 1, wherein
    said biological information region extraction unit extracts a range specified using a centroid of an image sampled by said sensor unit and a second order moment around the centroid, as a region containing biological information.

3. The biological information detecting device according to claim 1, further comprising
    a sensitivity variations correction unit for correcting sensitivity variations of the sampled image, using a ratio of pixel values of the background image.

4. The biological information detecting device according to claim 1, further comprising
    a sensitivity setting unit for setting a sensitivity used when sampling the biological information,
    wherein a threshold value at which the respective numbers of pixels at value of pixel levels lower and higher than the specific threshold assume a predetermined ratio is set to a sensitivity obtained based on a background pixel value.

5. The biological information detecting device according to claim 1, further comprising
    a pixel value correction unit whose upper value of pixel limit based on a maximum quantization level and lower value of pixel limit based on a minimum quantization level are a background value of pixel level of an extracted biological information region and a minimum value of the value of pixel level of the biological information region, respectively.

6. The biological information detecting device according to claim 1, further comprising
    an image determination unit determining a state of the sampled image, based on a mean value and a standard deviation of the extracted biological information region.

7. The biological information detecting device according to claim 6, wherein
    said image determination unit determines the state of the sampled image, based on a value obtained by normalizing the mean value and standard deviation of the extracted biological information region using a ratio between a sensitivity setting value of the sampled image and a sensitivity setting value of a background image.

8. The biological information detecting device according to claim 3, further comprising
    a correction unit eliminating noise from the sampled image, wherein
    a region containing biological information is extracted according to statistical information about a value of pixel distribution of a corrected image obtained from the said sensitivity variation correction unit.

9. The biological information detecting device according to claim 1, further comprising
    a sensitivity adjustment unit setting a threshold value at which the respective numbers of pixels at values lower and higher than the specific threshold assume a predetermined ratio, to a sensitivity that coincides with a background brightness in a pixel value frequency distribution of a biological information region extracted by said biological information region extraction unit.

10. The biological information detecting device according to claim 1, further comprising:
    a biological information determination unit that determines an existence/non-existence of biological information of a sampled image when the number of pixels in which two images consecutively sampled beyond a predetermined threshold value have different pixel values is substantially different from the number of pixels in said sensor, in an image group consecutively sampled using said sensor and does not determine an existence/non-existence of biological information of a sampled image when the number of pixels in which two images consecutively sampled beyond a predetermined threshold value have different pixel values almost equals the number of pixels in said sensor, in an image group consecutively sampled using said sensor; and an unnecessary information elimination unit for eliminating unnecessary information from a sampled image, using a corrected image determined to contain no biological information.

11. A method for executing a biological information detecting method by a biological information detecting device, the method comprising:

sampling biological information;

calculating statistical quantities, based on a value of pixel distribution of an image sampled in the sampling, and extracting a region containing the biological information, based on the statistical quantities; and correcting partial sensitivity fluctuations by homogenizing the value of pixel levels of a background in each partial region of the sampled image, wherein partial sensitivity fluctuations for each partial region are corrected by homogenizing the value of pixel levels of the background after homogenizing a mean value and standard deviation of the respective partial region when the standard deviation value of the respective partial region is not smaller than a standard deviation value of a total image whose sensitivity variations of each background image has been corrected, and, if the standard deviation value of the respective partial region is smaller than a standard deviation value of the total image whose sensitivity variations of each background image has been corrected, the partial sensitivity fluctuations for the respective partial region are not corrected by homogenizing standard deviation values for the respective partial region.

* * * * *

UNITED STATES PATENT AND TRADEMARK OFFICE
CERTIFICATE OF CORRECTION

PATENT NO.       : 7,965,874 B2  
APPLICATION NO.  : 11/268708  
DATED            : June 21, 2011  
INVENTOR(S)      : Yukihiro Abiko et al.

Page 1 of 1

It is certified that error appears in the above-identified patent and that said Letters Patent is hereby corrected as shown below:

Column 20, Line 8, In Claim 4, after "unit" delete "for".
Column 21, Line 3, In Claim 10, after "unit" delete "for".

Signed and Sealed this
Sixteenth Day of August, 2011

David J. Kappos
*Director of the United States Patent and Trademark Office*